United States Patent
Ogawa et al.

(10) Patent No.: US 11,726,924 B2
(45) Date of Patent: Aug. 15, 2023

(54) MEMORY SYSTEM FOR DATA ENCRYPTION

(71) Applicant: Kioxia Corporation, Tokyo (JP)

(72) Inventors: Takaya Ogawa, Kawasaki (JP); Hajime Matsui, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/653,567

(22) Filed: Mar. 4, 2022

(65) Prior Publication Data
US 2023/0071555 A1    Mar. 9, 2023

(30) Foreign Application Priority Data

Sep. 9, 2021  (JP) ................................. 2021-146946

(51) Int. Cl.
| | | |
|---|---|---|
| *G06F 12/00* | (2006.01) | |
| *G06F 12/14* | (2006.01) | |
| *G06F 21/60* | (2013.01) | |
| *G06F 12/02* | (2006.01) | |

(52) U.S. Cl.
CPC ...... *G06F 12/1408* (2013.01); *G06F 12/0246* (2013.01); *G06F 12/1441* (2013.01); *G06F 12/1466* (2013.01); *G06F 21/602* (2013.01); *G06F 21/604* (2013.01)

(58) Field of Classification Search
CPC ............. G06F 12/1408; G06F 12/0246; G06F 12/1441; G06F 12/1466; G06F 21/602; G06F 21/604
See application file for complete search history.

(56) References Cited

U.S. PATENT DOCUMENTS

| | | |
|---|---|---|
| 9,904,807 B2 | 2/2018 | Matsuo |
| 10,164,770 B1 | 12/2018 | Lee |
| 2016/0124843 A1* | 5/2016 | Kanno ................ G06F 12/0246 711/103 |
| 2020/0125770 A1 | 4/2020 | Lemay et al. |
| 2021/0328784 A1* | 10/2021 | Doi ........................ H04L 12/14 |

OTHER PUBLICATIONS

Hennessy et al., "Appendix B—Review of Memory Hierarchy", Book Companion of: Computer Architecture: A Quantitative Approach (6th Edition), 2019, 36 Pages.
NVM Express, Inc., "Trusted Computing Group and NVM Express Joint White Paper: TCG Storage, Opal, and NVMe", Aug. 2015, 11 Pages.

* cited by examiner

*Primary Examiner* — Arvind Talukdar
(74) *Attorney, Agent, or Firm* — Oblon, McClelland, Maier & Neustadt, L.L.P.

(57) ABSTRACT

According to one embodiment, a key search circuit includes a hit determination circuit that determines whether a key search request hits a content stored in a search result buffer, and an update determination circuit that determines whether to update the content stored in the search result buffer. When the hit determination circuit determines that the key search request hits the search result buffer, the key search circuit outputs the search result stored in the search result buffer to an encryption/decryption circuit. When the update determination circuit determines to update the search result buffer, the key search circuit updates the content stored in the search result buffer with the key search request and a search result obtained from a range table.

13 Claims, 15 Drawing Sheets

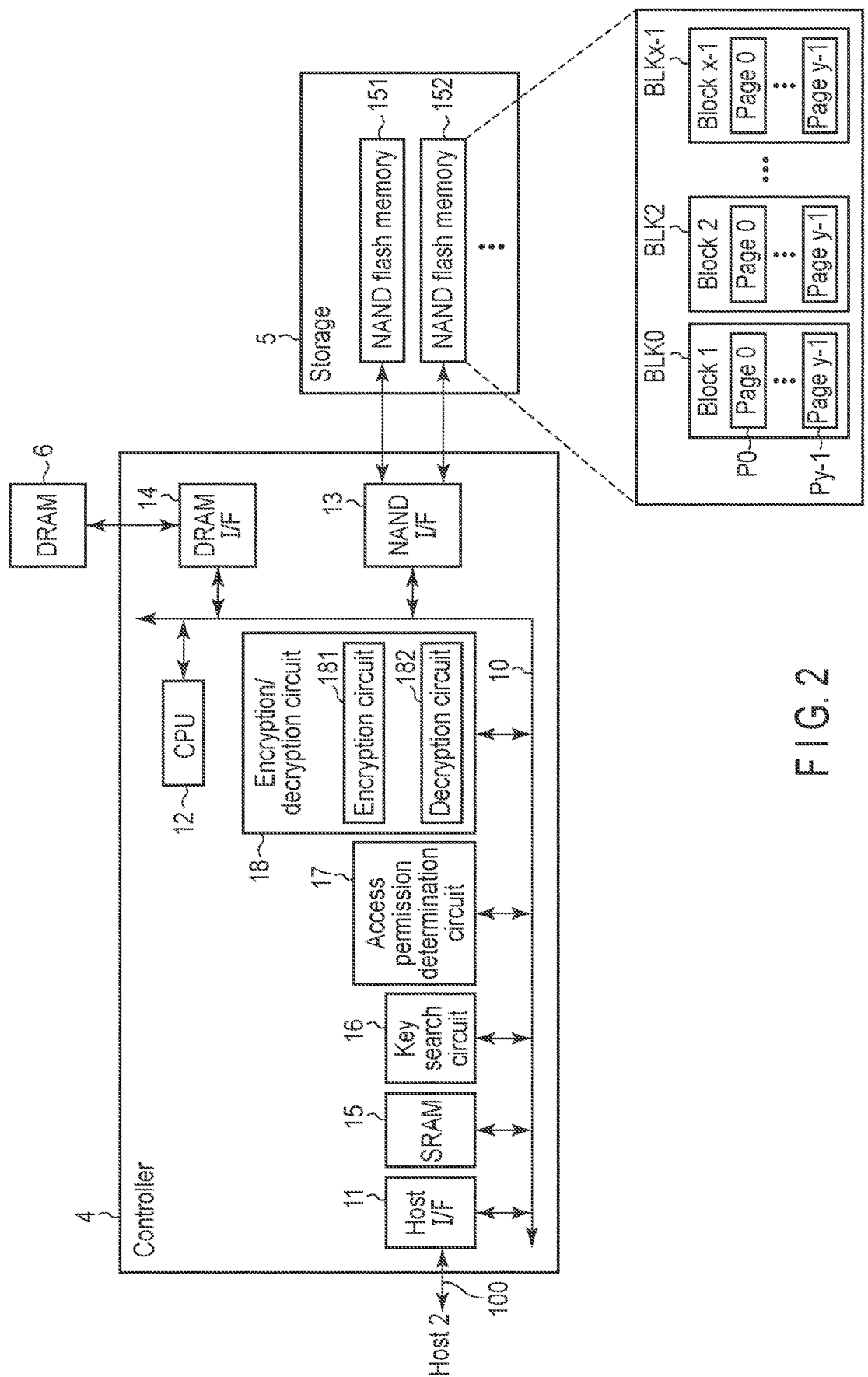
F I G. 2

F.I.G. 4

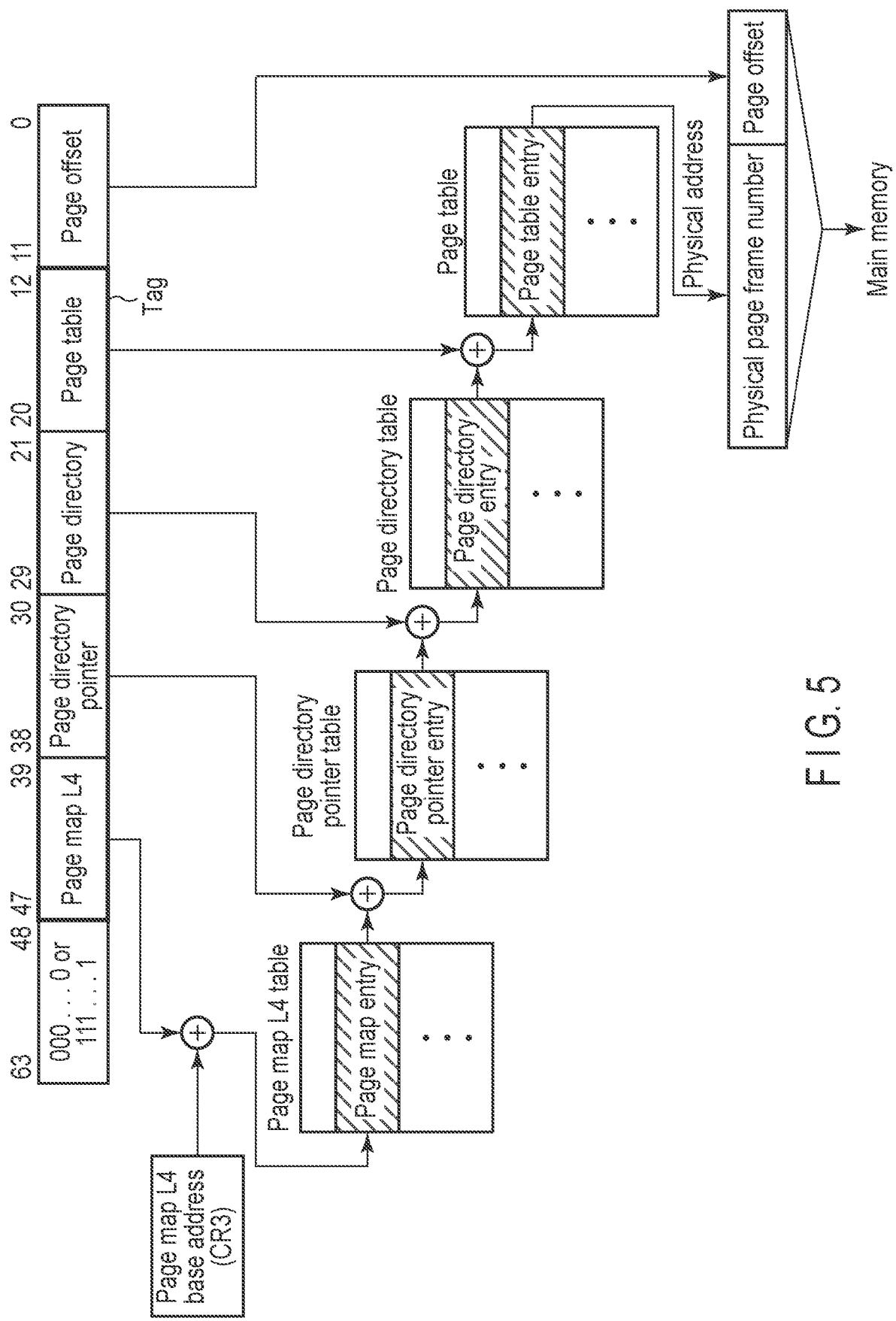
F I G. 5

| NSID | IsGlobal | Permission | Start LBA | End LBA | Encryption key |
|---|---|---|---|---|---|
| NS1 | 1 | -- | n/a | n/a | 🔑 |
| NS2 | 1 | rw | n/a | n/a | 🔑 |
| NS3 | 1 | -- | n/a | n/a | 🔑 |
| NS3 | 0 | rw | 0 | 99 | 🔑 |
| NS3 | 0 | rw | 100 | 199 | 🔑 |

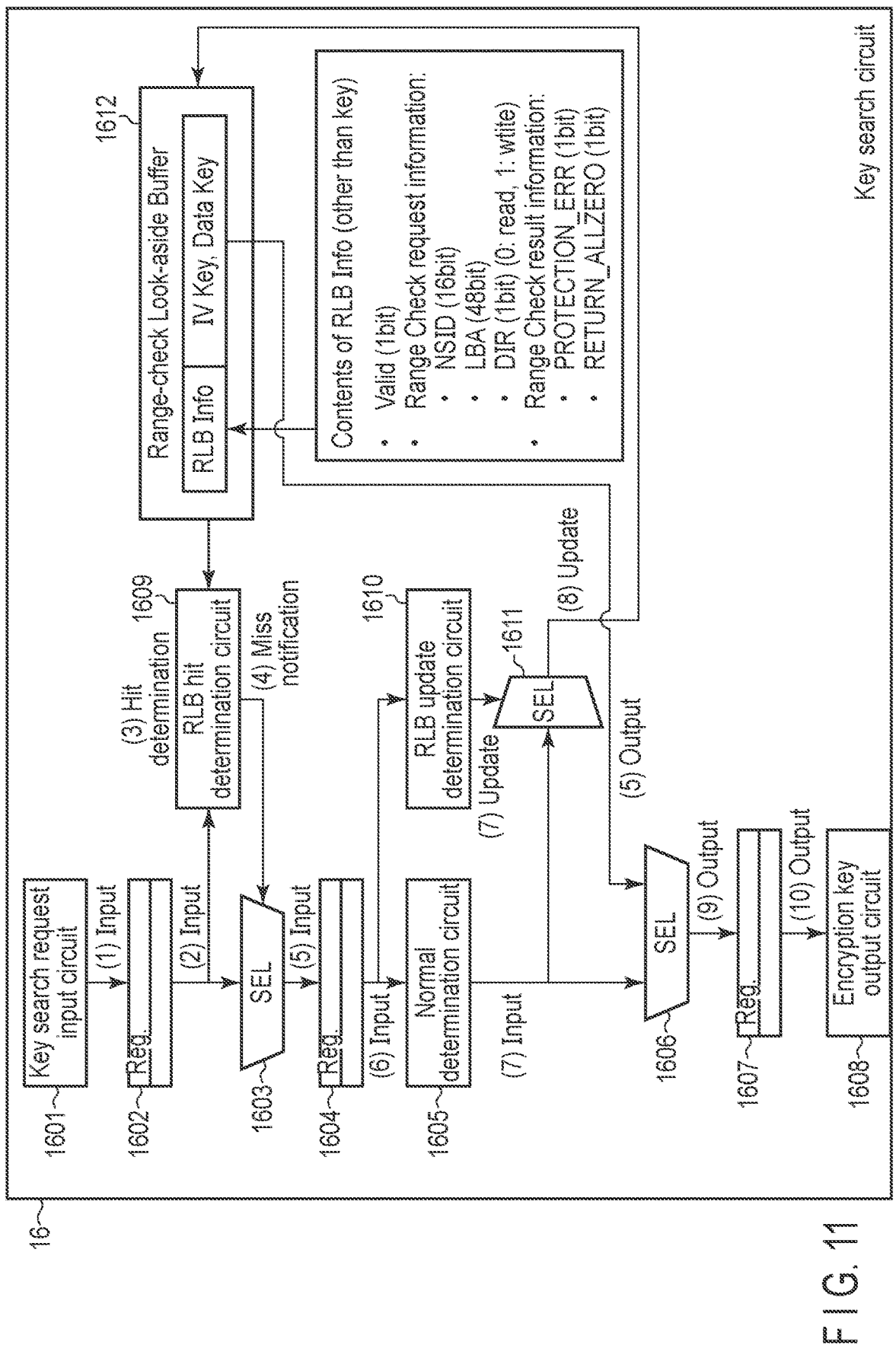
F I G. 11

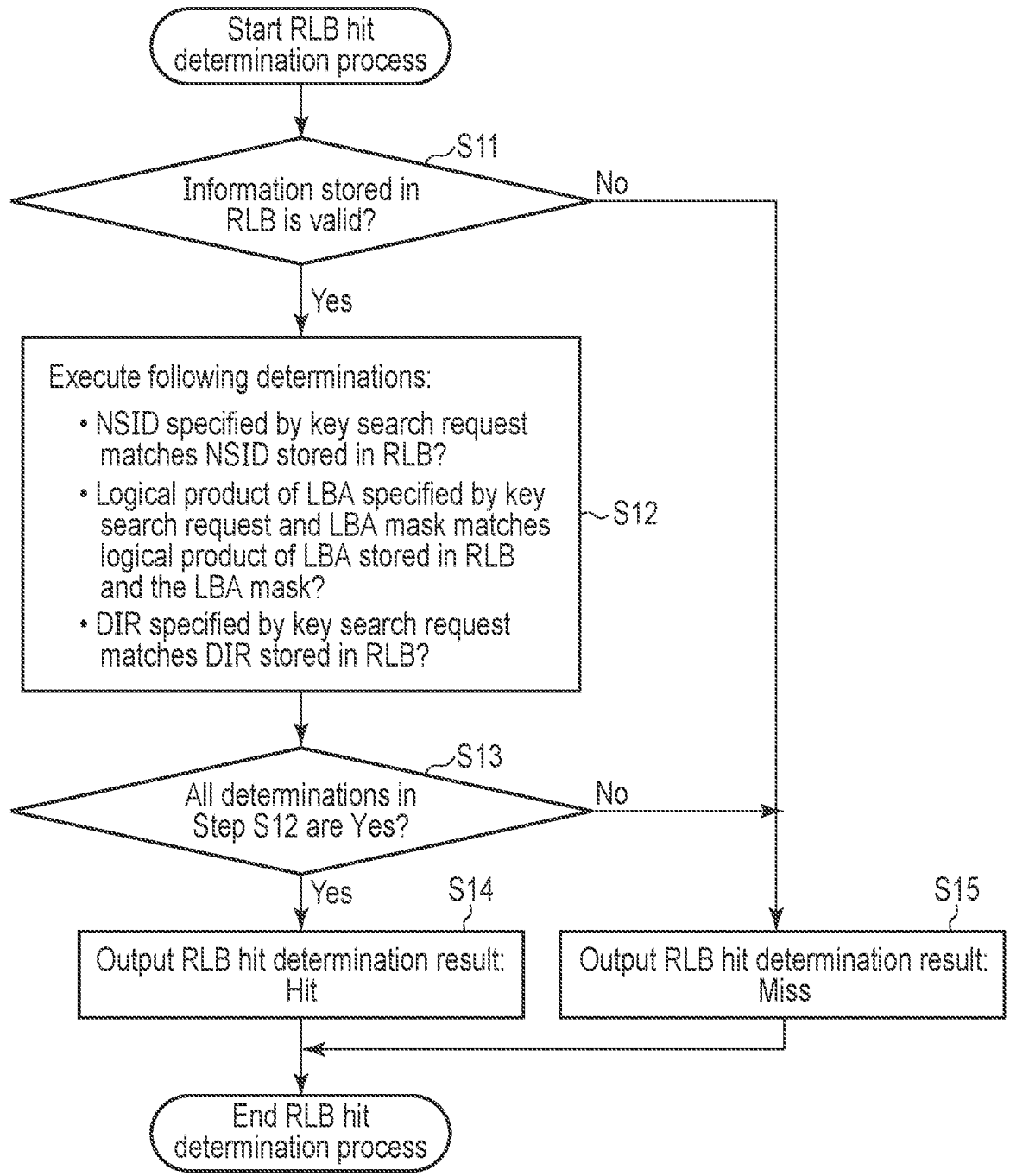
F I G. 13

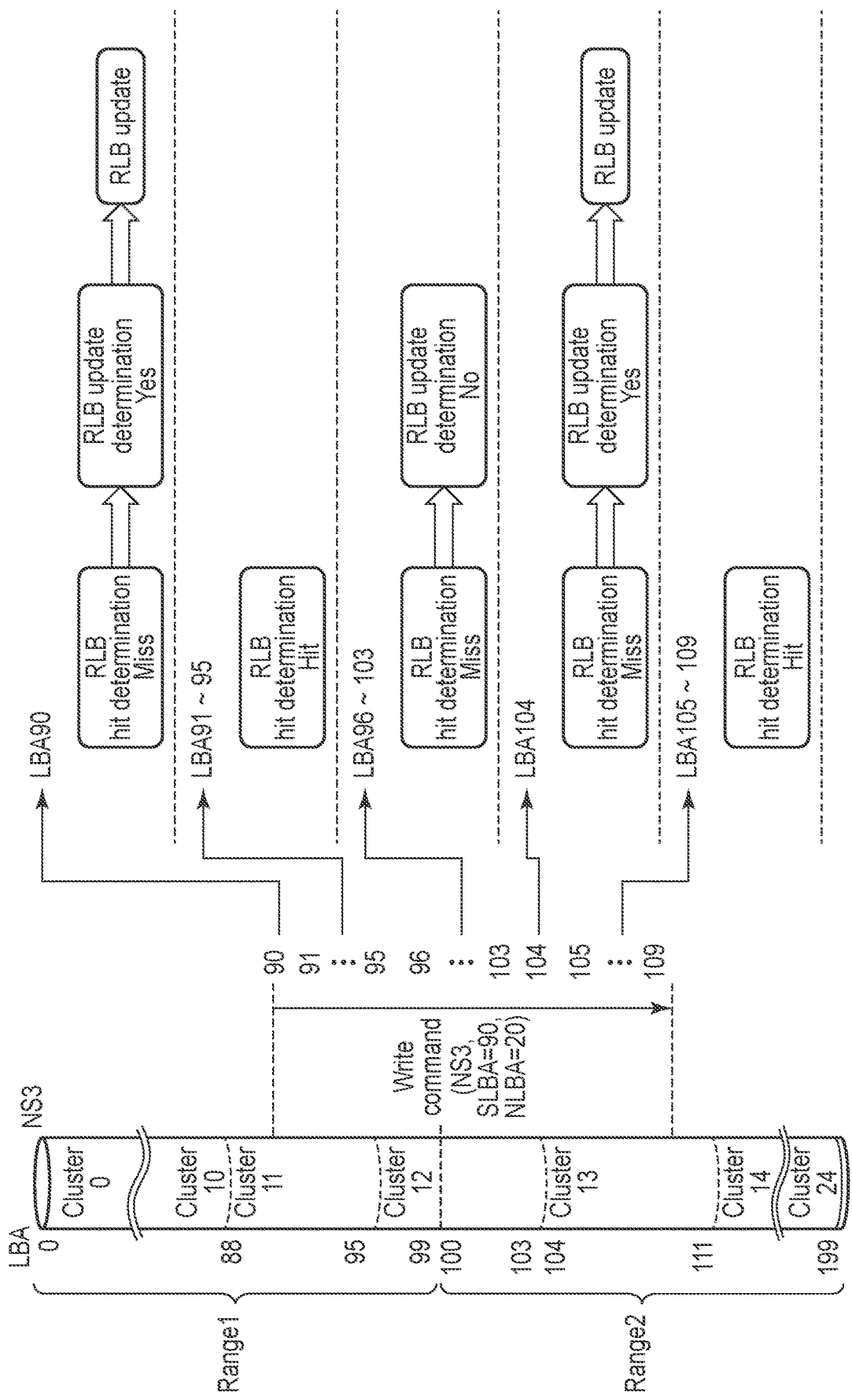
F I G. 15

MEMORY SYSTEM FOR DATA ENCRYPTION

CROSS-REFERENCE TO RELATED APPLICATIONS

This application is based upon and claims the benefit of priority from Japanese Patent Application No. 2021-146946, filed Sep. 9, 2021, the entire contents of which are incorporated herein by reference.

FIELD

Embodiments described herein relate generally to a technology for encrypting data that is to be written to a storage.

BACKGROUND

In recent years, memory systems implemented with nonvolatile memories have been widely used. As one of such memory systems, a solid state drive (SSD) implemented with a NAND flash memory has been known.

Recently, an SSD with a data encrypting function has also been developed. The SSD with the data encrypting function can be used as a self-encrypting drive.

In a memory system such as the SSD with the data encrypting function, encryption and decryption of data are executed by selectively using a plurality of encryption keys corresponding to a plurality of ranges.

Therefore, it is necessary to realize a new technology for reducing the time required to search for the encryption key in order to improve the I/O throughput of the memory system or reduce the I/O latency.

BRIEF DESCRIPTION OF THE DRAWINGS

FIG. 2 is a block diagram illustrating an example of configurations of a controller and a storage included in the memory system according to the embodiment.

FIG. 5 is a diagram illustrating a process of translating a virtual address into a physical address, the process being used in a processor according to a comparative example.

FIG. 8 is a diagram illustrating an example of a content of a range table managed in the memory system according to the embodiment.

FIG. 11 is a diagram illustrating an operation of the key search circuit in a case where a search result buffer miss occurs and it is determined to update a content stored in a search result buffer.

FIG. 13 is a flowchart illustrating a procedure of a search result buffer hit determination process executed in the memory system according to the embodiment.

FIG. 15 is a diagram illustrating a specific example of a key search operation executed for each logical block address included in an access range specified by an access request from a host.

DETAILED DESCRIPTION

Figure 1:
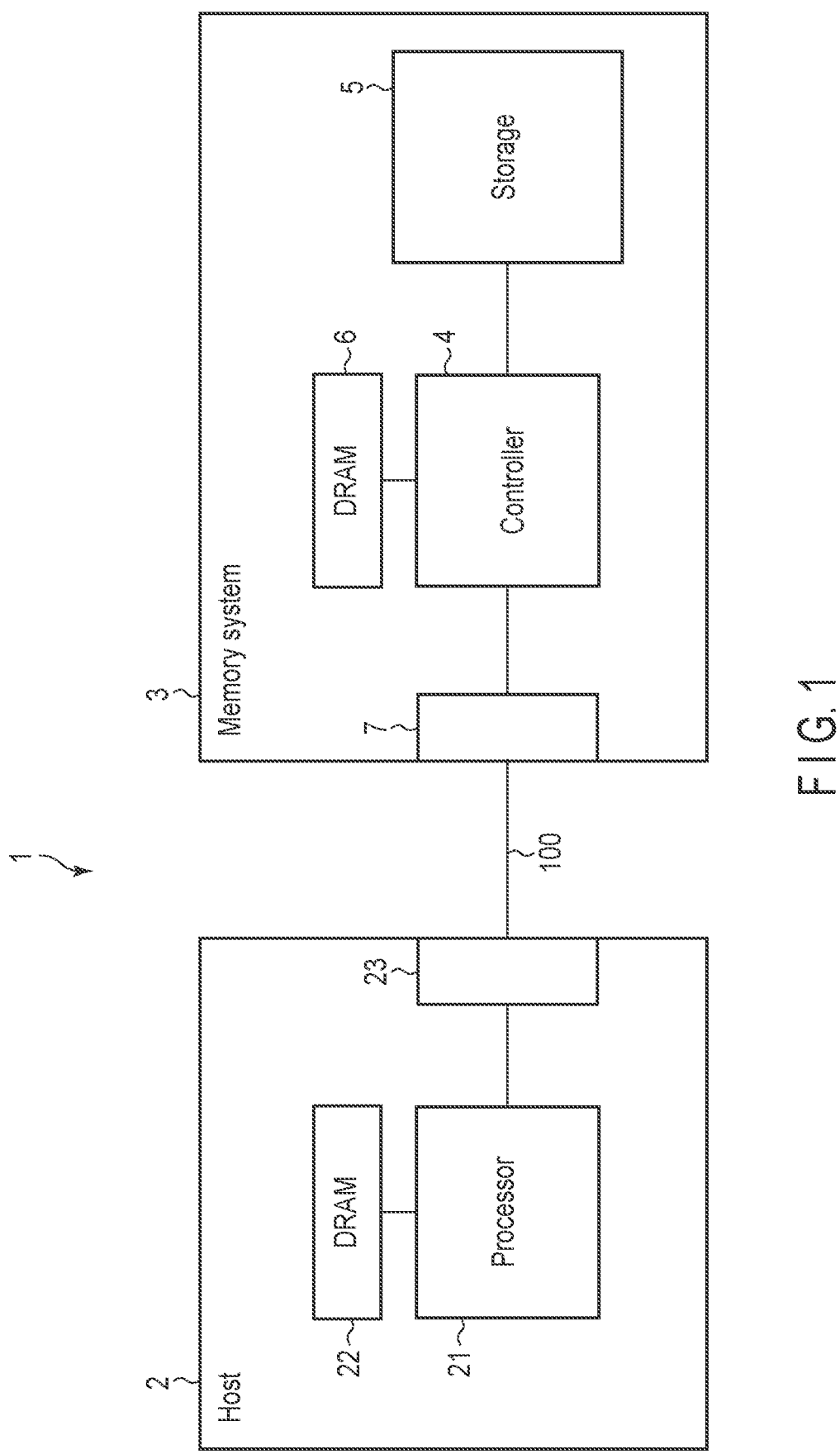
FIG. 1 is a block diagram illustrating an example of a configuration of an information processing system including a memory system according to an embodiment.

Various embodiments will be described hereinafter with reference to the accompanying drawings.

In general, according to one embodiment, a memory system connectable to a host includes a storage, an encryption/decryption circuit, and a key search circuit. The encryption/decryption circuit is configured to encrypt plain-text data received from the host using an encryption key obtained by the key search circuit to generate cipher-text data that is to be written to the storage, and decrypt the cipher-text data read from the storage using the encryption key to generate the plain-text data. The key search circuit is configured to output, in response to reception of a key search request from the encryption/decryption circuit, access control information and an encryption key which is to be used by the encryption/decryption circuit to the encryption/decryption circuit. The key search request specifies a logical block address specified by an access request received from the host and an access type indicating whether the access request is read or write. The access control information indicates permission or prohibition of access to the logical block address specified by the received key search request.

The key search circuit manages a range table that stores, for each of a plurality of ranges which are set in a logical block address space of the memory system, information indicating an address range of consecutive logical block addresses included in a corresponding range of the plurality of ranges, access control information indicating permission or prohibition of access to the corresponding range, and an encryption key which is to be applied to data corresponding to the corresponding range.

The key search circuit manages a search result buffer that stores a search result including access control information and an encryption key, which are obtained by referring to the range table based on a key search request, together with a key search request.

The key search circuit includes a hit determination circuit that determines whether the received key search request hits a content stored in the search result buffer, and an update determination circuit that determines whether to update the content stored in the search result buffer.

When the hit determination circuit determines that the received key search request hits the content stored in the search result buffer, the key search circuit outputs the search result stored in the search result buffer to the encryption/decryption circuit.

When the hit determination circuit determines that the received key search request does not hit the content stored in the search result buffer, the key search circuit obtains a search result from the range table by referring to the range table based on the received key search request, and outputs the search result obtained from the range table to the encryption/decryption circuit. The search result includes access control information indicating permission or prohibition of access to the logical block address specified by the received key search request and an encryption key that is to be applied to data corresponding to the logical block address.

When the update determination circuit determines to update the content stored in the search result buffer, the key search circuit updates the content stored in the search result buffer with the received key search request and the search result obtained from the range table.

First, a configuration of a memory system according to an embodiment will be described. FIG. 1 is a block diagram illustrating an example of a configuration of an information processing system including the memory system according to the embodiment. An information processing system 1 includes a host (host device) 2 and a memory system 3.

The host 2 is an information processing apparatus. The host 2 is, for example, a personal computer or a server computer. The host 2 accesses the memory system 3. Specifically, the host 2 transmits a write command, which is a command for writing data, to the memory system 3. Further, the host 2 transmits a read command, which is a command for reading data, to the memory system 3.

The memory system 3 is a storage device. The memory system 3 is connectable to the host 2 through a bus 100.

The bus 100 is mainly used to transmit an I/O command from the host 2 to the memory system 3 and to transmit a response from the memory system 3 to the host 2. The I/O command is a command for writing or reading data to or from the nonvolatile memory. Examples of the I/O command are the write command and the read command.

Communication between the host 2 and the memory system 3 through the bus 100 is executed, for example, in compliance with the NVM Express™ (NVMe™) standard. The bus 100 is, for example, a PCI Express™ bus (PCIe™ bus).

When the bus 100 is the PCIe bus, the bus 100 includes a plurality of lanes. Each of the plurality of lanes is a full-duplex data transmission path including a differential signal line pair for data transmission and a differential signal line pair for data reception.

Next, an internal configuration of the host 2 will be described. The host 2 includes a processor 21, a memory 22, and a connector 23.

The processor 21 is a central processing unit (CPU). The processor 21 communicates with the memory system 3 through the bus 100. The processor 21 executes software (host software) loaded into the memory 22. The host software is loaded into the memory 22 from the memory system 3 or another storage device connected to the host 2. The host software includes an operating system, a file system, a device driver, an application program, and the like.

The memory 22 is a volatile memory. The memory 22 is, for example, a random access memory such as a dynamic random access memory (DRAM).

The connector 23 is a connector configured for connection with a peripheral device. The connector 23 is, for example, a PCIe connector.

Next, an internal configuration of the memory system 3 will be described. The memory system 3 includes a controller 4, a storage 5, a DRAM 6, and a connector 7.

The controller 4 is a memory controller that controls the storage 5. The controller 4 is, for example, a System-on-a-Chip (SoC). The controller 4 is communicatively connected to the storage 5. The controller 4 executes writing and reading data to and from the storage 5. Further, the controller 4 executes communication with the host 2 through the bus 100.

The storage 5 is a nonvolatile memory such as a NAND flash memory. Although a case where the memory system 3 is realized as a solid state drive (SSD) implemented with the NAND flash memory as the storage 5 will be exemplified in the embodiment, a nonvolatile semiconductor memory other than the NAND flash memory, such as a NOR flash memory, a magnetoresistive random access memory (MRAM), a phase change random access memory (PRAM), a resistive random access memory (ReRAM), and a Ferroelectric random access memory (FeRAM), may be provided as the storage 5. Further, the memory system 3 according to the embodiment may be realized as an SD card or a USB memory implemented with a nonvolatile memory, or may be realized as a hard disk drive (HDD) implemented with a magnetic disk medium as the storage 5, instead of the nonvolatile semiconductor memory.

The DRAM 6 is a volatile memory. A part of the memory region of the DRAM 6 is used, for example, as a data buffer for temporarily storing data. Further, the other part of the memory region of the DRAM 6 is used to store management data to be used by the controller 4.

Next, an internal configuration of the controller 4 will be described. FIG. 2 is a block diagram illustrating an example of configurations of the controller 4 and the storage 5 included in the memory system 3 according to the embodiment. FIG. 2 illustrates the case where the memory system 3 is realized as the solid state drive (SSD) implemented with the NAND flash memory as the storage 5.

The memory system 3 is a self-encrypting drive having a data encrypting function. The memory system 3 is realized as, for example, an NVM Express™ (NVMe™) SSD based on with the TCG Opal standard.

The controller 4 includes a host interface circuit (I/F) 11, a CPU 12, NAND interface circuit (I/F) 13, a DRAM interface circuit (I/F) 14, a static random access memory (SRAM) 15, a key search circuit 16, an access permission determination circuit 17, and an encryption/decryption circuit 18. The host interface circuit 11, the CPU 12, the NAND interface circuit 13, the DRAM interface circuit 14, the SRAM 15, the key search circuit 16, the access permission determination circuit 17, and the encryption/decryption circuit 18 are connected to an internal bus 10.

The host interface circuit 11 is a hardware interface. The host interface circuit 11 executes communication with the host 2 through the bus 100. The communication between the host interface circuit 11 and the host 2 is executed, for example, based on the NVMe standard. The host interface circuit 11 receives various commands from the host 2. The various commands include the write command, the read command, and the like.

The CPU 12 is a processor. The CPU 12 loads a control program (firmware) from a ROM (not illustrated) or the storage 5 into the DRAM 6 or the SRAM 15 in response to supply of power to the memory system 3. The CPU 12 performs various processes by executing the loaded control program (firmware). The CPU 12 executes, for example, management of data stored in NAND flash memories 151, 152, and so on, which are used as the storage 5, and management of blocks included in the NAND flash memories 151, 152, and so on, as a flash translation layer (FTL). The management of data is, for example, management of mapping information indicating a correspondence relationship between each of logical addresses and each of physical addresses. The logical address is an address used by the host 2 to access the memory system 3. The logical address is, for example, a logical block address LBA. The physical address is an address indicating a physical storage location included in the NAND flash memories 151, 152, and so on. The management of blocks included in NAND flash memories 151, 152, and so on is, for example, management of defective blocks (bad blocks) included in the NAND flash memories 151, 152, and so on, wear leveling, and garbage collection.

The NAND interface circuit 13 is an example of a storage interface circuit that controls the storage 5. The NAND interface circuit 13 is a circuit that controls the NAND flash memories 151, 152, and so on. The NAND interface circuit 13 is connected to each of the NAND flash memories 151, 152, and so on, for example, through a plurality of channels.

The DRAM interface circuit 14 is a circuit that controls the DRAM 6.

The SRAM 15 is a volatile memory that can be accessed at a higher speed than the DRAM 6. Instead of the DRAM 6, a part of a memory region of the SRAM 15 may be used as a data buffer, and the other part of the memory region of the SRAM 15 can also be used to store management data to be used by the controller 4.

The key search circuit 16, the access permission determination circuit 17, and the encryption/decryption circuit 18 are hardware used to implement the data encrypting function.

The key search circuit 16 is a circuit that executes a key search process. The key search process is a process of outputting to the encryption/decryption circuit 18 access control information indicating permission or prohibition of access to the LBA specified by a key search request, received from an encryption/decryption circuit 18, and an encryption key that is to be used by the encryption/decryption circuit 18. The encryption key that is to be used by the encryption/decryption circuit 18 means an encryption key that is to be used for encryption or decryption of data corresponding to the LBA specified by the key search request.

The key search circuit 16 manages a range table. The range table is a table configured to store information regarding each of a plurality of ranges which are set in a logical block address space of the memory system 3. The range table includes a plurality of entries corresponding to the plurality of ranges (LBA ranges). Each of the plurality of entries in the range table stores information indicating an LBA range that belongs to a certain range, access control information indicating permission or prohibition of access to this range, and an encryption key that is to be applied to data corresponding to this range.

The key search request which is output from the encryption/decryption circuit 18 specifies an LBA specified by an access request (write command or read command) received from the host 2 and an access type indicating whether this access request is read or write.

When the key search request is received from the encryption/decryption circuit 18, the key search circuit 16 basically refers to the range table and obtains a search result including the access control information and the encryption key from the range table.

The range table is the table configured to store information regarding each of the plurality of ranges (LBA ranges) which are set in the logical block address space of the memory system 3. The range table includes the plurality of entries corresponding to the plurality of ranges. Each of the plurality of entries stores information indicating a range of consecutive LEAs included in a corresponding range, access control information indicating permission or prohibition of access to this range, and an encryption key that is to be applied to data corresponding to this range.

In the memory system 3 according to the embodiment, the key search circuit 16 further manages a search result buffer. The search result buffer is used to store a search result obtained by referring to the range table based on a key search request, together with this key search request. The search result includes the access control information and the encryption key. The search result buffer can be stored in a memory that can be read at a higher speed than the range table. For example, in a case where the range table is stored in the DRAM 6, the search result buffer may be stored in the SRAM 15. Further, in a case where the range table is stored in the SRAM 15, the search result buffer may be stored in a flip-flop circuit (not illustrated) of the key search circuit 16. Note that the search result buffer may be stored in the memory in which the range table is stored. The number of entries included in the search result buffer is smaller than the number of the entries in the range table. Therefore, even in a case where the search result buffer and the range table are stored in the same memory, the search result can be obtained from the search result buffer at a higher speed.

The key search circuit 16 further includes a search result buffer hit determination circuit and a search result buffer update determination circuit.

The search result buffer hit determination circuit is a hit determination circuit that determines whether a received key search request hits a content stored in the search result buffer. The search result buffer hit determination circuit can determine whether the received key search request hits the content stored in the search result buffer by comparing the received key search request with the key search request stored in the search result buffer.

When the search result buffer hit determination circuit determines that the received key search request hits the content stored in the search result buffer, the key search circuit 16 outputs the search result stored in the search result buffer to the encryption/decryption circuit 18.

On the other hand, when the search result buffer hit determination circuit determines that the received key search request does not hit the content stored in the search result buffer, the key search circuit 16 refers to the range table based on the received key search request to obtain a search result from the range table, and outputs the obtained search result to the encryption/decryption circuit 18. The search result obtained from the range table includes access control information indicating permission or prohibition of access to an LBA specified by the received key search request, and an encryption key that is to be applied to data corresponding to this LBA.

The search result buffer update determination circuit is a determination circuit that determines whether to update the content stored in the search result buffer. When the search result buffer update determination circuit determines to update the content stored in the search result buffer, the key search circuit 16 updates the content stored in the search result buffer with the received key search request and the search result obtained from the range table. That is, the received key search request and the search result obtained from the range table are stored in the search result buffer.

In this manner, in the memory system 3 according to the embodiment, the key search circuit 16 executes the key search process using the search result buffer and the range table. The search result buffer stores both a certain key search request and a search result obtained by referring to the range table based on this key search request. Therefore, it can be determined whether or not a search result matching a new key search request received from the encryption/decryption circuit 18 is stored in the search result buffer. Thus, when the received key search request hits the content stored in the search result buffer, the desired search result can be obtained immediately without referring to the range table. Thus, even if the memory system 3 is configured to support a large number of ranges (LBA ranges), it is possible to reduce the latency of key search. As a result, it is possible to improve the I/O throughput or reduce the I/O latency of the memory system 3.

In a case where an access range specified by an access request includes a plurality of LBAs, the key search circuit 16 sequentially receives a plurality of key search requests as many as the number of the LBAs included in this access range from the encryption/decryption circuit 18. Each of the plurality of key search requests specifies one of LBAs included in the access range and an access type indicating whether the access request is read or write. Each time one of key search requests is received from the encryption/decryption circuit 18, the key search circuit 16 executes the key search process. Therefore, in the case where the plurality of LBAs are included in the access range specified by the access request, the key search process is executed as many times as the number of LBAs. Then, the key search circuit 16 outputs the number of search results as many as the number of the LBAs.

The key search circuit 16 can also execute an access permission determination process. The access permission determination process is a process of determining permission or prohibition of access to the entire access range specified by the access request (write command or read command) received from the host 2.

The access permission determination circuit 17 is a circuit that executes, based on a result of the access permission determination process, a process of terminating a command as an error or a process of transferring control to the encryption/decryption circuit 18.

The encryption/decryption circuit 18 is a circuit that executes an encryption process and a decryption process. The encryption process and the decryption process are executed using the encryption key obtained by the key search circuit 16. In a case where the access control information indicating the prohibition of access is output from the key search circuit 16, the encryption process and the decryption process are not executed. The encryption/decryption circuit 18 includes an encryption circuit 181 and a decryption circuit 182.

The encryption circuit 181 executes the encryption process. The encryption process is a process of encrypting plain-text data received from the host 2 using the encryption key obtained by the key search circuit 16 to generate cipher-text data that is to be written to the storage 5. The generated cipher-text data (that is, encrypted data) is written to the storage 5 (that is, NAND flash memory) by the NAND interface circuit 13. Further, the CPU 12 may execute predetermined processing, such as error correction encoding on the generated cipher-text data, and then, the data on which the predetermined processing has been executed may be written in the storage 5 via the NAND interface circuit 13. That is, data based on the generated cipher-text data is written to the storage 5 via the NAND interface circuit 13.

The decryption circuit 182 executes the decryption process. The decryption process is a process of decrypting cipher-text data read from the storage 5 (that is, NAND flash memory) using the encryption key obtained by the key search circuit 16 to generate plain-text data. The generated plaintext data is transmitted to the host 2 by the host interface circuit 11. Further, the CPU 12 may execute predetermined processing, such as error correction processing, on data read from the storage 5 via the NAND interface circuit 13 to generate cipher-text data, and then, the decryption circuit 182 may execute the decryption process of generating plain-text data by decrypting the cipher-text data using the encryption key obtained by the key search circuit 16. That is, the decryption process is a process of decrypting the cipher-text data based on the data read from the storage 5 using the encryption key obtained by the key search circuit 16 to generate the plain-text data.

Next, an internal configuration of the NAND flash memory provided as the storage 5 will be described. Each of the NAND flash memories 151, 152, and so on is a NAND flash memory die. Each of the NAND flash memories 151, 152, and so on includes a plurality of blocks BLK0 to BLKx-1. Each of the blocks BLK0 to BLKx-1 is a unit for a data erase operation. The data erase operation is an operation of erasing data. Each of the blocks BLK0 to BLKx-1 is also referred to as a physical block, an erase block, a flash block, or a memory block. Each of the blocks BLK0 to BLKx-1 includes a plurality of pages P0 to Py-1. Each of the pages P0 to Py-1 is a unit for a data write operation and a data read operation. The data write operation is an operation for writing data. The data read operation is an operation for reading data. Each of the pages P0 to Py-1 includes a plurality of memory cells connected to the same word line.

Figure 3:
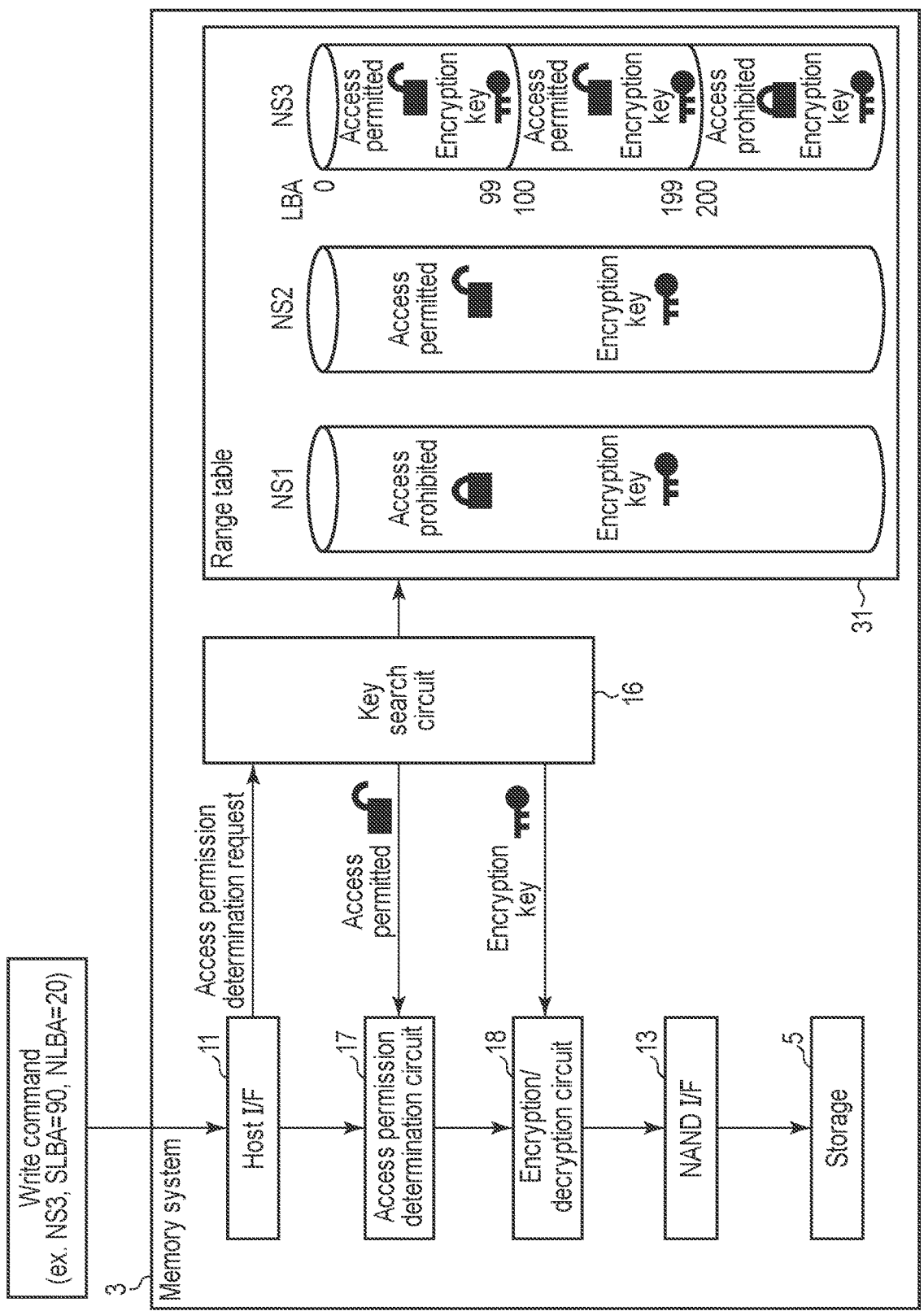
FIG. 3 is a diagram illustrating a data encryption process executed with using a range table managed in the memory system according to the embodiment.

Next, the data encryption process will be described. FIG. 3 is a diagram illustrating the data encryption process executed using a range table 31 managed in the memory system 3 according to the embodiment. Here, a case where the key search process is executed without using the search result buffer will be described.

When an access request (write command or read command) is received from the host 2, the memory system 3 operates as follows. Here, a case where the memory system 3 receives a write command from the host 2 is assumed.

(1) The host 2 issues a write command (for example, NS3, SLBA=90, NLB=20) to the memory system 3. This write command specifies an identifier of namespace (NSID), a start LBA (SLBA) of an access range, and the number of logical blocks (NLB) included in the access range. Each of the logical blocks corresponds to a sector specified by one LBA. Therefore, the number of logical blocks (NLB) is the number of sectors included in the access range, that is, the number of LBAs included in the access range. NS3 is a namespace identifier that identifies a namespace NS3. This write command is a command that requests write of data to 20 logical blocks (20 sectors) from LBA 90 to LBA 109 in the namespace NS3.

(2) When this write command is received from the host 2, the host interface circuit 11 transmits an access permission determination request to the key search circuit 16 to inquire of the key search circuit 16 whether access to the entire access range specified by this write command is permitted. The access permission determination request includes information specifying an access range, and access type information indicating read or write for this access range.

(3) When receiving the access permission determination request, the key search circuit 16 refers to the range table 31 to confirm a lock/unlock state of the entire access range. If the entire access range is in the unlocked state, the key search circuit 16 transmits a determination result indicating that "access is permitted" to the access permission determination circuit 17. On the other hand, if at least a part of the access range is in the locked state, the key search circuit 16 transmits a determination result indicating that "access is prohibited" to the access permission determination circuit 17. In the example of FIG. 3, in the namespace NS3, LBA 90 to LBA 99 and LBA 100 to LBA 109 are set to different ranges, but the both are in the unlocked state (state illustrated with an illustration of an unlocked padlock). Therefore, the key search circuit 16 transmits the determination result indicating that "access is permitted" to the access permission determination circuit 17. In this manner, the access permission determination process is executed in units of access requests (commands). Note that the permission or prohibition of access to each range can be set per access type indicating read or write. If the entire access range is in the unlocked state regarding write, the key search circuit 16 transmits the determination result indicating that "access is permitted" to the access permission determination circuit 17.

(4) When the key search circuit 16 determines that "access is permitted", the access permission determination circuit 17 transfers control to the encryption/decryption circuit 18. On the other hand, when the key search circuit 16 determines that "access is prohibited", the access permission determination circuit 17 terminates the processing of the received write command as an error, and transmits a response indicating the error of the received write command to the host 2 via the host interface circuit 11.

(5) When the key search circuit 16 determines that "access is permitted", the encryption/decryption circuit 18 sequentially outputs the 20 key search requests corresponding to the 20 LBAs (LBA 90 to LBA 109) to the key search circuit 16. Each time receiving a key search request, the key search circuit 16 obtains a search result from the range table 31 by referring to the range table 31. Then, the key search circuit 16 outputs the search result to the encryption/decryption circuit 18. As a result, the encryption/decryption circuit 18 sequentially receives 20 search results corresponding to the 20 LBAs (LBA 90 to LBA 109) from the key search circuit 16. Each of the 20 search results includes access control information indicating permission or prohibition of access to an LBA specified by a corresponding key search request, and an encryption key that is to be applied to data corresponding to this LBA. Since the access to the entire LBA range (LBA 99 to LBA 109) has already been permitted here, the access control information included in each of the key search requests basically indicates the permission of access to the corresponding LBA. Further, LBA 90 to LBA 99 and LBA 100 to LBA 109 belong to the ranges which are different from each other. Therefore, each of 10 search results corresponding to LBA 90 to LBA 99 includes an encryption key corresponding to the range to which LBA 90 to LBA 99 belongs. On the other hand, each of 10 search results corresponding to LBA 100 to LBA 109 includes another encryption key corresponding to the other range to which LBA 100 to LBA 109 belongs. When one search result corresponding to a certain key search request is received, the encryption/decryption circuit 18 encrypts write data for one sector corresponding to an LBA specified by this key search request using an encryption key included in this search result, thereby generating cipher-text data that is to be written to the storage 5.

In this manner, the key search process is executed for each key search request, and thus, is executed in units of LBAs (sectors). As a result, even if an access range spans different ranges, it is possible to correctly obtain an encryption key corresponding to the range to which each LBA included in the access range belongs.

Note that the description has been given in FIG. 3 regarding the case where the encryption/decryption circuit 18 transmits the key search request to the key search circuit 16 after the access permission determination process is executed for the entire access range specified by the write command. However, since each of search results includes access control information indicating permission or prohibition of access to a LBA and an encryption key that is to be applied to data corresponding to this LBA, the execution of the access permission determination process can be omitted. Even in such a case, it is possible to prohibit access to each of LBAs included in a range which is set in the locked state.

Further, there is also a case where an access range specified by a write command includes only one LBA. In this case, it suffices that the encryption/decryption circuit 18 outputs to the key search circuit 16 one key search request specifying this LBA and an access type indicating write, and obtains only one search result from the key search circuit 16.

Figure 4:
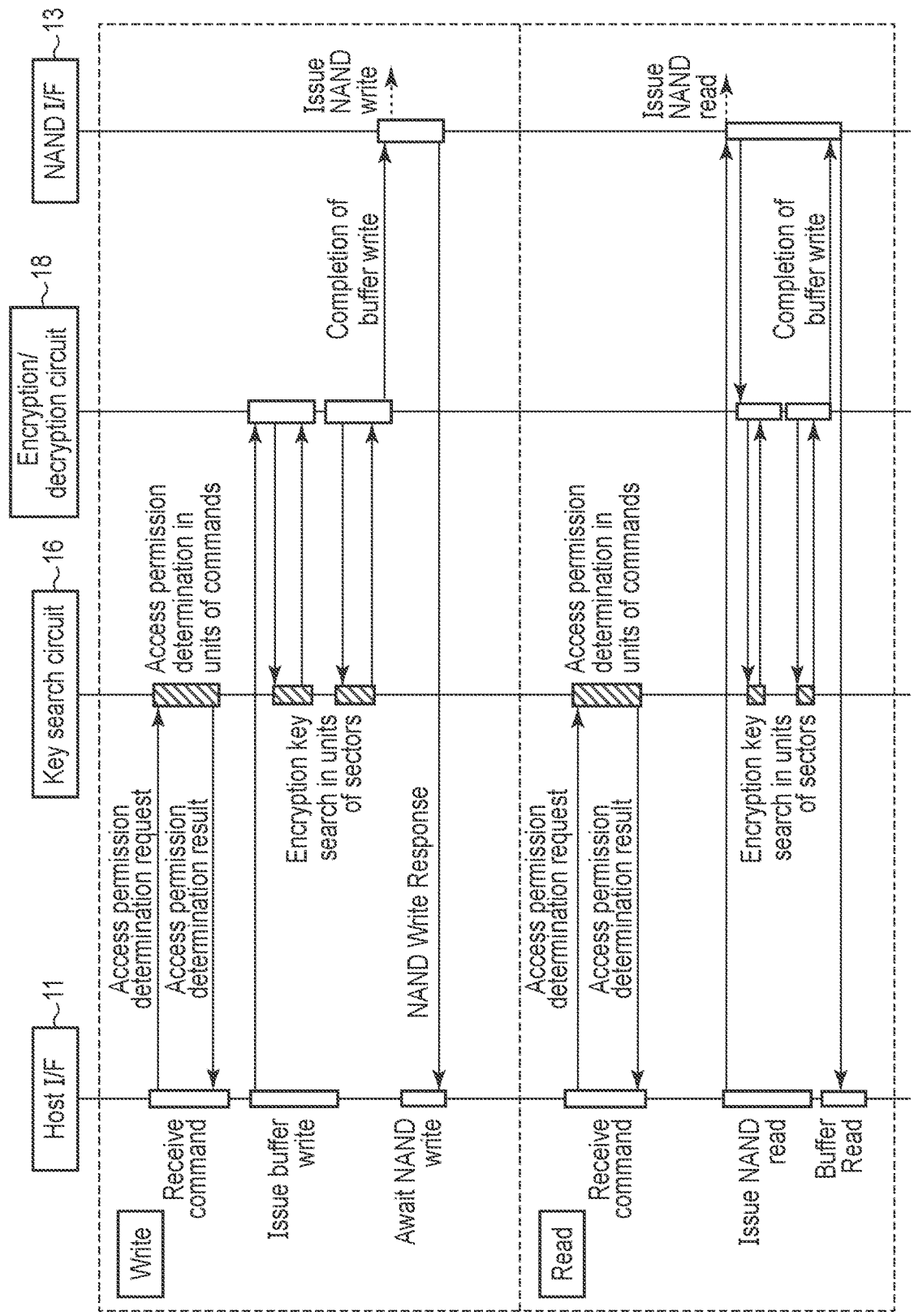
FIG. 4 is a sequence diagram illustrating procedures of the data encryption process and a data decryption process executed in the memory system according to the embodiment.

Next, procedures of the data encryption process and the data decryption process will be described. FIG. 4 is a sequence diagram illustrating the procedures of the data encryption process and the data decryption process executed in the memory system 3 according to the embodiment.

The upper part of FIG. 4 illustrates the procedure of the data encryption process executed by the controller 4 in response to reception of a write command from the host 2.

When the host interface circuit 11 receives a write command from the host 2, an access permission determination request is transmitted from the host interface circuit 11 to the key search circuit 16. The key search circuit 16 executes the access permission determination process in units of commands. Then, an access permission determination result is sent from the key search circuit 16 to the host interface circuit 11 in units of commands.

When the access permission determination result corresponding to the received write command indicates access permission, control is transferred from the host interface circuit 11 to the encryption/decryption circuit 18. In this case, the host interface circuit 11 executes a process of storing write data that is to be encrypted in the data buffer (not illustrated) and a process of requesting the encryption/decryption circuit 18 to prepare encrypted write data in the data buffer (issues buffer write).

The encryption/decryption circuit 18 transmits a key search request to the key search circuit 16 for each of LBAs included in an access range specified by the write command. Then, the key search circuit 16 executes the key search process in units of sectors. When a search result corresponding to a certain LBA is obtained from the key search circuit 16, the encryption/decryption circuit 18 executes a process of generating cipher-text data by encrypting write data corresponding to this LBA using an encryption key included in the obtained search result and a process of writing the generated cipher-text data to the data buffer. When pieces of cipher-text data corresponding to all LBAs included in the access range specified by the write command are prepared in the data buffer, the encryption/decryption circuit 18 notifies the NAND interface circuit 13 of the completion of the buffer write. The NAND interface circuit 13 writes the cipher-text data stored in the data buffer to the NAND flash memory 151 (or 152). When the write to the NAND flash memory 151 (or 152) is completed, the NAND interface circuit 13 notifies the host interface circuit 11 of a response (NAND write response) indicating that the write to the NAND flash memory 151 (or 152) has been completed. When receiving this notification, the host interface circuit 11 transmits a command completion response indicating the completion of the write command to the host 2.

The lower part of FIG. 4 illustrates the procedure of the data decryption process executed by the controller 4 in response to reception of a read command from the host 2.

When the host interface circuit 11 receives a read command from the host 2, an access permission determination request is transmitted from the host interface circuit 11 to the key search circuit 16. The key search circuit 16 executes the access permission determination process in units of commands. Then, an access permission determination result is sent from the key search circuit 16 to the host interface circuit 11 in units of commands.

When the access permission determination result corresponding to the received read command indicates access permission, the host interface circuit 11 requests the NAND interface circuit 13 to read data (cipher-text data) corresponding to an LBA range specified by the read command (issues NAND read). Then, the host interface circuit 11 requests the encryption/decryption circuit 18 to prepare plain-text data obtained by decrypting the cipher-text data in the data buffer.

The NAND interface circuit 13 reads the cipher-text data from the NAND flash memory 151 (or 152) in units of pages, for example. The read cipher-text data is stored in the data buffer. The encryption/decryption circuit 18 transmits a key search request to the key search circuit 16 for each of LBAs included in an access range specified by the read command. Then, the key search circuit 16 executes the key search process in units of sectors. When a search result corresponding to a certain LBA is obtained from the key search circuit 16, the encryption/decryption circuit 18 executes a process of generating plain-text data by decrypting cipher-text data corresponding to this LBA using an encryption key included in the obtained search result and a process of writing the generated plain-text data to the data buffer. When pieces of plain-text data corresponding to all LBAs included in the access range specified by the read command are prepared in the data buffer, the host interface circuit 11 reads the plain-text data from the data buffer and transmits the read plain-text data to the host 2.

In this manner, the number of the different encryption key required for one access request (I/O command) is not limited to one, and there is a case where a plurality of different encryption keys corresponding to a plurality of ranges are used. Therefore, it is necessary to associate one encryption key with one LBA. The maximum number of ranges that can be set for the memory system 3 is defined as the product specifications of the memory system 3, and is defined as at least eight or more in the TOG Opal standard, and is sometimes several hundred in practice.

Next, an example of processing performance required for the encryption process and the decryption process will be described. Here, it is assumed a case where a PCIe interface having a configuration of PCI Express Gen 6×4 lanes is used as the bus 100.

The throughput that saturates the PCIe interface having the configuration of PCI Express Gen 6×4 lanes is 31.5 GB/s. When the memory system 3 using a format that stores 512 bytes of data per LBA is accessed, an average time required per LBA (512 bytes) is 16 ns ($512/(31.5 \times 10^9)$ sec). In a case where the controller 4 is configured to operate, for example, on a clock having a frequency of 500 MHz, 16 ns corresponds to 8 cycles of this clock. That is, the key search circuit 16 needs to obtain an encryption key within 8 cycles on average.

When it is necessary to associate one piece of information with another piece of information at a high speed in this manner, speed-up using a cache is a general solution. For example, regarding a processor, code or data stored in one place on an external DRAM is often used over and over again for some time. Therefore, a configuration in which an instruction cache and a data cache are built in the same chip as the processor is generally used.

An example of the speed-up using a cache is a translation look-aside buffer (TLB) of a memory management unit (MMU) included in a processor having a virtual memory function although the purpose, configuration, and effect thereof are different from those of the memory system 3 according to the embodiment. The virtual memory function of the processor has a function of translating a virtual address specified by a program into an actual physical address. As a result, it is possible to place programs at various physical addresses and to run the programs at the same time without changing the programs, and it is possible to run many programs with a small amount of physical memory by delaying actual allocation of the physical addresses to the programs until the time of actual use.

Here, a configuration and an effect of the translation of a virtual address into a physical address will be described. FIG. 5 is a diagram illustrating a process of translating a virtual address into a physical address, the process being used in a processor according to a comparative example.

A 64-bit virtual address is illustrated at the top of FIG. 5. Here, bits [63:48] are all 0 or 1, and are assumed to have the same value as a bit [47], and the remaining 48 bits [47:0] substantially serve as a virtual address space.

The upper 9 bits [47:39] of the 48 bits [47:0] are used as an index to refer to a page map L4 table. The following 9 bits [38:30] of the 48 bits [47:0] are used as an index to refer to a page directory pointer table. The next following 9 bits [29:21] of the 48 bits [47:0] are used as an index to refer to a page directory table. The next following 9 bits [20:12] of the 48 bits [47:0] are used to refer to a page table.

A physical address stored in a page map L4 base address register (CR3 register) indicates a base address of the page map L4 table. An external DRAM is referred to using a physical address obtained by adding 9 bits [47:39], as an offset, to the physical address stored in the CR3 register. As a result, a physical address stored in one entry among 512 entries included in the page map L4 table is obtained.

The physical address obtained from the page map L4 table indicates a base address of the page directory pointer table. The external DRAM is referred to again using a physical address obtained by adding 9 bits [38:30], as an offset, to the physical address obtained from the page map L4 table. As a result, a physical address stored in one entry among 512 entries included in the page directory pointer table is obtained.

The physical address obtained from the page directory pointer table indicates a base address of the page directory table. The external DRAM is referred to again using a physical address obtained by adding 9 bits [29:21], as an offset, to the physical address obtained from the page directory pointer table. As a result, a physical address stored in one entry among 512 entries included in the page directory table is obtained.

The physical address obtained from the page directory table indicates a base address of the page table. The external DRAM is referred to again using a physical address obtained by adding 9 bits [20:12], as an offset, to the physical address obtained from the page directory table. As a result, a 28-bit physical address stored in one entry among 512 entries included in the page table is obtained.

This 28-bit physical address indicates a physical page frame number among physical page frame numbers each having a size of 4 KB.

The lower 12 bits [11:0] of the virtual address are added to the physical page frame number as an in-page offset address. As a result, a 40-bit physical address including the physical page frame number and the in-page offset address is obtained.

Since the page directory table and the page table are located on the external DRAM in this manner, it is required to refer to the external DRAM four times in order to translate the virtual address into the physical address.

Figure 6:
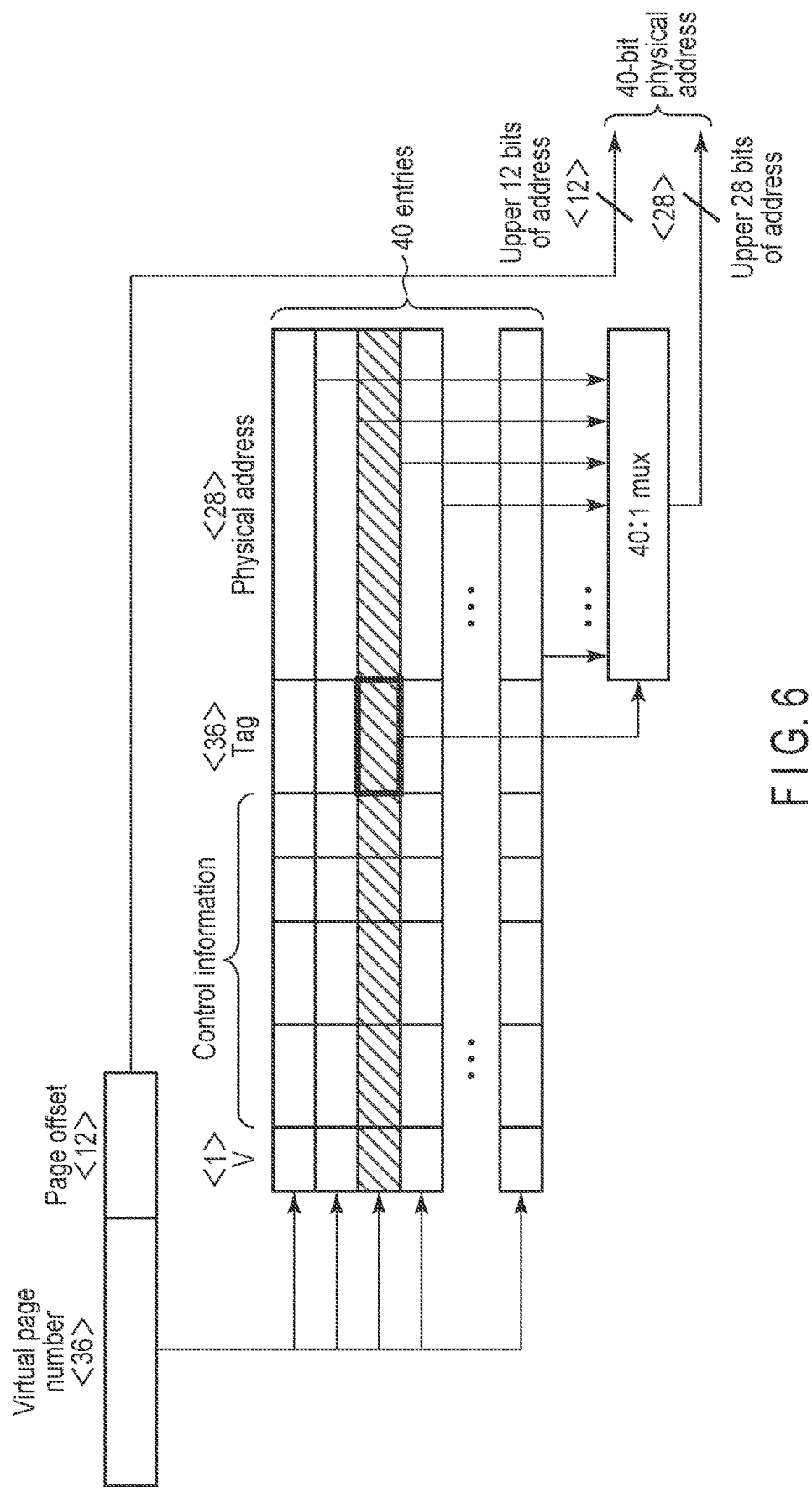
FIG. 6 is a diagram illustrating an example of configuration of a translation look-aside buffer (TLB) used in the processor according to the comparative example.

FIG. 6 is a diagram illustrating an example of a configuration of a translation look-aside buffer (TLB) used in the processor according to the comparative example.

Here, an example of a configuration of a fully-associative TLB having 40 entries is illustrated. The TLB is not the external DRAM, but a storage area built into the same chip as the processor. Therefore, access to the TLB can be executed at a high speed. The TLB serves as the cache of the page table described in FIG. 5. That is, each of the entries in the TLB stores tag information (36 bits [47:12]) and a 28-bit physical address (physical page frame number) corresponding to this tag information.

When a virtual address is translated into a physical address, 36 bits [47:12] of the virtual address are compared with the tag information stored in each of the 40 entries in the TLB. As a result, it is determined whether the TLB has an entry storing tag information that matches the 36 bits [47:12] of the virtual address.

When the TLB has the entry storing the tag information that matches the 36 bits [47:12] of the virtual address, a 28-bit physical address stored in this entry is a desired physical page frame number. The lower 12 bits [11:0] of the virtual address are added to the physical page frame number as an in-page offset address. As a result, a 40-bit physical address including the physical page frame number and the in-page offset address is obtained.

Although the configuration of the page table as illustrated in FIG. 5 has a hierarchical structure, it is sufficient to use a part of the virtual address directly as the index for the reference of the page directory table and the page table reference. Further, the TLB in FIG. 6 has the fully-associative configuration, it is necessary to compare a part [47:12] of the virtual address with the tag information in all the 40 entries. However, it is sufficient to determine only whether the part [47:12] of the virtual address exactly matching the tag information in such a comparison operation.

Figure 7:
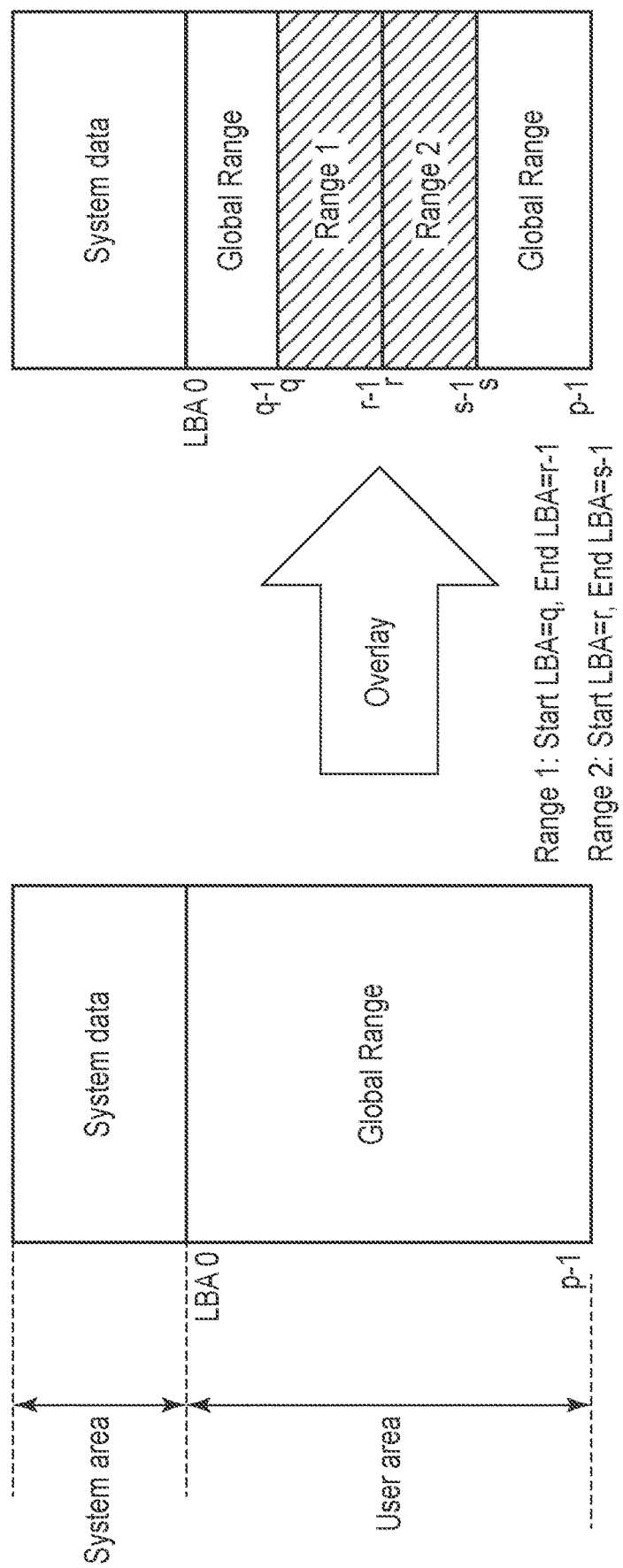
FIG. 7 is a diagram illustrating an example of a range setting process executed in the memory system according to the embodiment.

Next, an example of a range setting compliant with the TCG Opal standard will be described. FIG. 7 is a diagram illustrating an example of a range setting process executed in the memory system 3 according to the embodiment.

The storage region of the storage 5 of the memory system 3 is roughly divided into a system area and a user area. The system area is allocated for storing of system information of the memory system 3 and is not allowed to be referred to from the outside. The user area is a storage area that can be referred to from the outside. In the user area, LBAs are allocated in order from 0. In the initial state after shipment of the memory system 3, the entire user area is in a state of being allocated to an area called a global range. As an administrator allocates LBA ranges each including consecutive LBAs, such as Range 1 and Range 2, to the global range, different users can encrypt and store data with different encryption keys. Here, the administrator specifies the LBA range by specifying a start LBA and an end LBA (or an LBA size of the range) of each range. Note that areas, such as Range 1 and Range 2, are overlaid on the global range. As a result, the global range originally allocated to the respective LBA ranges of Range 1 and Range 2 is hidden by each of Range 1 and Range 2. Further, the LBA range corresponding to each range can be set in a unit of one LBA in the minimum unit.

FIG. 8 is a diagram illustrating an example of the content of the range table 31 managed in the memory system 3 according to the embodiment.

The range table 31 has a data structure in which a pair of a start LBA and an end LBA is used as a setting unit. Although a size of a range is set instead of the end LBA in the TCG Opal standard, the size of the range is information for identifying an end of the range, which is essentially equivalent to the example in FIG. 8 in that the range is defined by information on the start and end. In the example of the range table 31 in FIG. 8, specifically, each entry has the following information.

NSID: The NSID is a namespace identifier. NSID is defined by NVMe standard.

IsGlobal Flag: The IsGlobal flag is a flag (having a value of "0" or "1") that indicates whether a target of a corresponding range setting is the global range. The IsGlobal flag of "1" indicates that a corresponding range is the global range. The IsGlobal flag of "0" indicates that the corresponding range is not the global range.

Permission Information: The permission information is access control information indicating permission or prohibition of access to the corresponding range setting. The permission information includes information indicating permission or prohibition of read access and information indicating permission or prohibition of write access. Here, "r" indicates that read is permitted, "w" indicates that write is permitted, and "-" indicates that read or write is not permitted. For example, "--" indicates that read is not permitted, and write is not permitted either. Further, "r-" indicates that read is permitted, but write is not permitted. Further, "-w" indicates that read is not permitted, but write is permitted. Further, "rw" indicates that read is permitted, and write is also permitted.

Start LBA and End LBA: The start LBA and the end LBA indicate a start LBA and an end LBA which are targets of the corresponding range setting. In the case of the global range, the start LBA and the end LBA are not set since the entire global range is the target of the setting.

Encryption Key: The encryption key indicates an encryption key to be used in the corresponding range.

In this manner, the range table 31 based on the TCG Opal standard is different from the page table in the virtual memory of the processor, and does not have a data structure in which a desired encryption key or permission information can be searched for by referring to a range table by directly using an LBA as an index. If an attempt is made to manage the range setting with a data structure similar to the page table in the virtual memory of the processor, a required additional storage capacity becomes enormous. For example, a data encryption key of the XTS-AES-256 scheme, which is generally used, is 64 bytes, and thus, it is necessary to store the 64-byte data encryption key in association with each of LBAs in the case of adopting the data structure in which the desired encryption key can be simply searched for using the LBA. When the data capacity per LBA is 512 bytes, 64 bytes per LBA are additionally required to store the data encryption key. Therefore, the additional data capacity is consumed by 10% or more. In a case where the range table 31 has the data structure in which the desired encryption key can be simply searched for using the LBA, a size of the range table 31 becomes huge, and thus, it is necessary to store the range table 31 in the DRAM 6. In this case, the latency for referring to the range table 31 occurs, and thus, it is practically impossible to search such a huge data structure, for example, to satisfy a constraint of obtaining the encryption key within 8 cycles on average which is a design constraint described above.

Therefore, there is a need for a new technology that can reduce the time required to search for the encryption key and the access control information in the configuration in which the LBA range, the encryption key, and the access control information corresponding to each range are managed using the range table 31 based on the TCG Opal standard.

Figure 9:
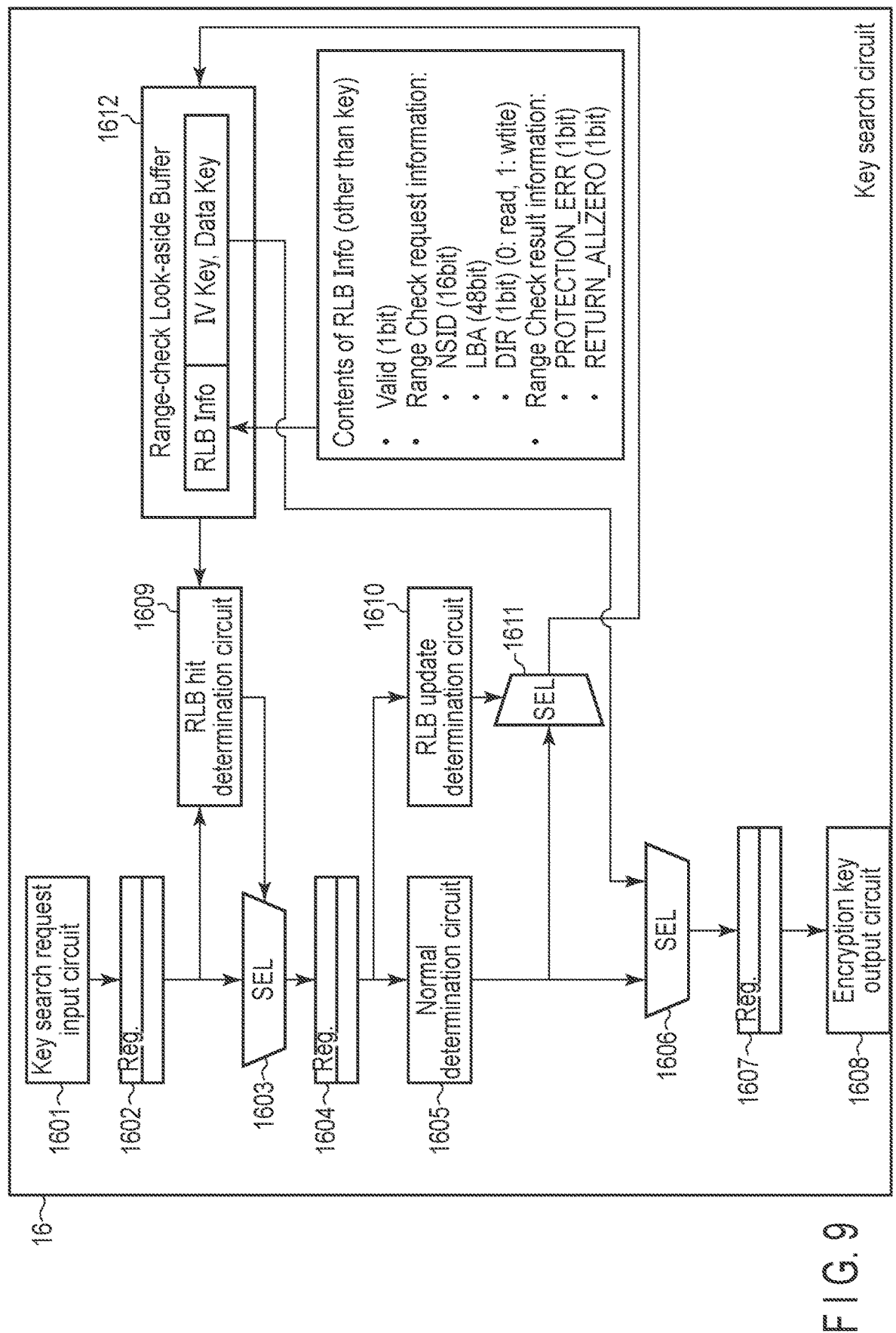
FIG. 9 is a block diagram illustrating an example of a configuration of a key search circuit included in the controller of the memory system according to the embodiment.

Next, details of the key search circuit 16 will be described. FIG. 9 is a block diagram illustrating an example of a configuration of the key search circuit 16 included in the controller 4 of the memory system 3 according to the embodiment. The key search circuit 16 includes a key search request input circuit 1601, a register 1602, a selector 1603, a register 1604, a normal determination circuit 1605, a selector 1606, a register 1607, an encryption key output circuit 1608, an RLB hit determination circuit 1609, an RLB update determination circuit 1610, a selector 1611, and a range-check look-aside buffer (RLB) 1612.

The key search request input circuit 1601 is a circuit that receives a key search request from the encryption/decryption circuit 18. When receiving the key search request, the key search request input circuit 1601 inputs the received key search request to the register 1602.

The register 1602 is a storage circuit. The register 1602 temporarily stores the key search request.

The selector 1603 is a selection circuit. The selector 1603 selects whether to input the key search request obtained from the register 1602 to the register 1604 based on a control signal received from the RLB hit determination circuit 1609.

The register 1604 is a storage circuit. The register 1604 temporarily stores the key search request.

The normal determination circuit 1605 is a circuit that executes a normal determination process. The normal determination circuit 1605 obtains a key search request from the register 1604. Then, the normal determination circuit 1605 executes a process of obtaining a search result including access control information and an encryption key from the range table 31 by referring to the range table 31 based on the obtained key search request, as the normal determination process. Specifically, the normal determination circuit 1605 identifies an entry in the range table 31 that includes information regarding a range corresponding to an NSID and a logical block address (LBA) specified by the received key search request. Then, the normal determination circuit 1605 obtains the access control information and the encryption key as the search result from the identified entry of the range table 31. The normal determination circuit 1605 inputs the obtained search result to the selector 1606 and the selector 1611.

The selector 1606 is a selection circuit. The selector 1606 selects a search result input from either the normal determination circuit 1605 or the RLB 1612, and inputs the selected search result to the register 1607.

The register 1607 is a storage circuit. The register 1607 temporarily stores the search result.

The encryption key output circuit 1608 is a circuit that outputs the search result. The encryption key output circuit 1608 obtains the search result stored in the register 1607. Then, the encryption key output circuit 1608 outputs the search result to the encryption/decryption circuit 18 as a response to the key search request. The search result output by the encryption key output circuit 1608 includes the access control information and the encryption key.

The RLB hit determination circuit 1609 is a search result buffer hit determination circuit. The RLB hit determination circuit 1609 obtains the key search request input by the key search request input circuit 1601 from the register 1602. The RLB hit determination circuit 1609 determines whether the obtained key search request hits the search result stored in the RLB 1612. The RLB 1612 stores a key search request and a search result corresponding to this key search request. Therefore, the RLB hit determination circuit 1609 determines whether the obtained key search request hits the search result stored in the RLB 1612 based on whether the obtained key search request matches the key search request stored in the RLB 1612. For example, the RLB hit determination circuit 1609 can determine whether the received key search request hits the content stored in the RLB 1612 based on whether the an LBA specified by the obtained key search request and an LBA specified by the key search request stored in the RLB 1612 are included in the same batch search unit. Here, the batch search unit is one of a plurality of batch search units obtained by dividing an LBA space for accessing the memory system 3 into units each including a predetermined number of consecutive LBAs. The batch search unit is, for example, a cluster including eight consecutive LBAs.

When the obtained key search request hits the search result stored in the RLB 1612, the RLB hit determination circuit 1609 transmits a hit notification to the selector 1603. The hit notification is transmitted to the selector 1603 as a control signal for instructing not to input the key search request obtained from the register 1602 to the register 1604. If the obtained key search request does not hit (misses) the search result stored in the RLB 1612, the RLB hit determination circuit 1609 sends a miss notification to the selector 1603. The miss notification is transmitted to the selector 1603 as a control signal for instructing to input the key search request obtained from the register 1602 to the register 1604.

The RLB update determination circuit 1610 is a search result buffer update determination circuit. The RLB update determination circuit 1610 obtains a key search request from the register 1604. The RLB update determination circuit 1610 determines whether to update the content stored in the RLB 1612 based on the obtained key search request. For example, the RLB update determination circuit 1610 can determine whether to update the content stored in the RLB 1612 based on whether range boundaries of a plurality of ranges managed by the range table 31 are included inside a batch search unit that includes an LBA specified by the obtained key search request. If no range boundary is included inside the batch search unit (for example, cluster) that includes the LBA specified by the obtained key search request, the RLB update determination circuit 1610 determines to update the content stored in the RLB 1612. On the other hand, when the range boundary is included inside the batch search unit that includes the LBA specified by the obtained key search request, the RLB update determination circuit 1610 determines not to update the content stored in the RLB 1612. When it is determined to update the content stored in the RLB 1612, the RLB update determination circuit 1610 transmits a control signal for instructing the selector 1611 to update the content stored in the RLB 1612 using a search result input from the normal determination circuit 1605. When it is determined not to update the content stored in the RLB 1612, the RLB update determination circuit 1610 transmits a control signal for instructing the RLB 1612 not to update the search result, input from the normal determination circuit 1605, to the selector 1611.

The selector 1611 is a selection circuit. The selector 1611 selects whether to update the content stored in the RLB 1612 using the search result input from the normal determination circuit 1605 based on the control signal transmitted from the RLB update determination circuit 1610.

The RLB 1612 is a search result buffer. The RLB 1612 is the buffer that stores a key search request and a search result obtained by the normal determination circuit 1605 corresponding to this key search request. The key search request and search result stored in the RLB 1612 are called RLB Info. Specifically, the RLB Info includes a valid flag, Range Check request information, and Range Check result information. The valid flag is a flag indicating whether a search result stored in the RLB 1612 is valid. The Range Check request information is information indicating a key search request. The Range Check request information includes an NSID which is information for identifying a namespace included in the key search request, an LBA which is information indicating a logical block address included in the key search request, and DIR which is a flag that indicates whether a command associated with the key search request is a read command or a write command. The Range Check result information includes PROTECTION_ERR which is a flag indicating access control information, and RETURN_ALLZERO which is a flag indicating whether a condition for returning all zeros as read data for the read command is satisfied. IV Key is one of encryption keys in an XTS-AES mode. Data Key is also one of the encryption keys in the XTS-AES mode.

Figure 10:
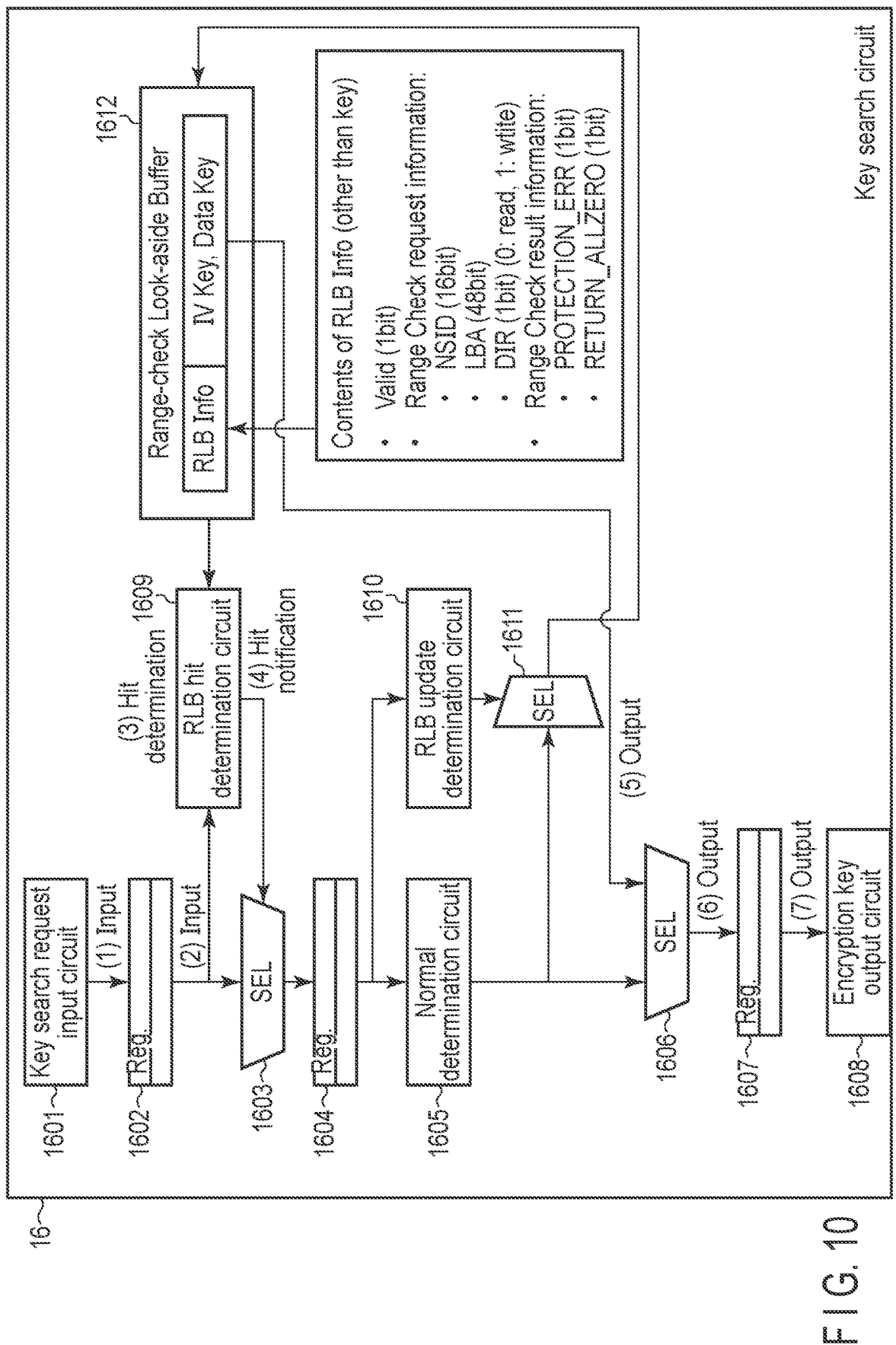
FIG. 10 illustrates an operation of the key search circuit in a case where a search result buffer hit occurs.

Next, a description will be given regarding an operation of the key search circuit 16 in a case where the RLB hit determination circuit 1609 determines that the key search request hits the content stored in the RLB 1612. FIG. 10 illustrates the operation of the key search circuit in a case where a search result buffer hit occurs. First, the key search request input circuit 1601 starts to operate in response to the key search request input circuit 1601 of the key search circuit 16 receiving a key search request from the encryption/decryption circuit 18.

(1) The key search request input circuit 1601 inputs the received key search request to the register 1602.

(2) The RLB hit determination circuit 1609 obtains the key search request from the register 1602. Then, the selector 1603 also obtains the key search request from the register 1602.

(3) The RLB hit determination circuit 1609 determines whether the obtained key search request hits a search result stored in the RLB 1612. Here, a case where the obtained key search request hits the search result stored in the RLB 1612 will be described.

(4) The RLB hit determination circuit 1609 transmits a hit notification to the selector 1603. The selector 1603 having received the hit notification is controlled not to input the input key search request to the register 1604.

(5) The RLB hit determination circuit 1609 having performed a hit determination outputs the search result stored in the RLB 1612 to the selector 1606.

(6) The selector 1606 to which the search result has been input from the RLB 1612 selects the search result and outputs the search result to the register 1607.

(7) The encryption key output circuit 1608 obtains the search result from the register 1607 and outputs the obtained search result to the encryption/decryption circuit 18.

As a result, the key search circuit 16 can output the search result including access control information and an encryption key, which correspond to the key search request, without executing the normal determination process by the normal determination circuit 1605.

Next, a description will be given regarding an operation of the key search circuit 16 in a case where the RLB hit determination circuit 1609 determines that the obtained key search request does not hit (misses) the search result stored in the RLB 1612 and the RLB update determination circuit 1610 determines to update the content stored in the RLB 1612. FIG. 11 is a diagram illustrating the operation of the key search circuit in a case where a search result buffer miss occurs and it is determined to update the content stored in the search result buffer. First, the key search request input circuit 1601 starts to operate in response to the key search request input circuit 1601 of the key search circuit 16 receiving a key search request from the encryption/decryption circuit 18, which is similar to FIG. 10.

(1) The key search request input circuit 1601 inputs the received key search request to the register 1602.

(2) The RLB hit determination circuit 1609 obtains the key search request from the register 1602. Then, the selector 1603 also obtains the key search request from the register 1602.

(3) The RLB hit determination circuit 1609 determines whether the obtained key search request hits a search result stored in the RLB 1612. Here, a case where the obtained key search request does not hit (misses) the search result stored in the RLB 1612 will be described.

(4) The RLB hit determination circuit 1609 transmits a miss notification to the selector 1603. The selector 1603 having received the miss notification is controlled to input the input key search request to the register 1604.

(5) The selector 1603 inputs the key search request obtained from the register 1602 to the register 1604 based on the miss notification transmitted from the RLB hit determination circuit 1609.

(6) The normal determination circuit 1605 and the RLB update determination circuit 1610 obtain the key search request from the register 1604.

(7) The normal determination circuit 1605 executes the normal determination process, and the RLB update determination circuit 1610 determines whether to update the content stored in the RLB 1612. The normal determination circuit 1605 inputs a search result obtained by the normal determination process to the selector 1606 and the selector 1611. Then, the RLB update determination circuit 1610 transmits a notification indicating whether to update the RLB 1612 to the selector 1611. Here, a case where the RLB update determination circuit 1610 notifies an update determination will be described.

(8) The selector 1611 updates the RLB 1612 using the search result input from the normal determination circuit 1605 based on the update determination transmitted from the RLB update determination circuit 1610. As a result, the content stored in the RLB 1612 is updated.

(9) The selector 1606 to which the search result has been input from the normal determination circuit 1605 selects the search result and outputs the search result to the register 1607.

(10) The encryption key output circuit 1608 obtains the search result from the register 1607 and outputs the obtained search result to the encryption/decryption circuit 18.

As a result, the key search circuit 16 can newly store the search result, obtained by executing the normal determination process by the normal determination circuit 1605, in the RLB 1612. Therefore, when a key search request that specifies the same cluster is received next, the operation in the case where the RLB hit determination circuit 1609 makes the hit determination, described in FIG. 10, is executed. Thus, it is possible to output the search result including access control information and an encryption key without executing the normal determination process by the normal determination circuit 1605.

Figure 12:
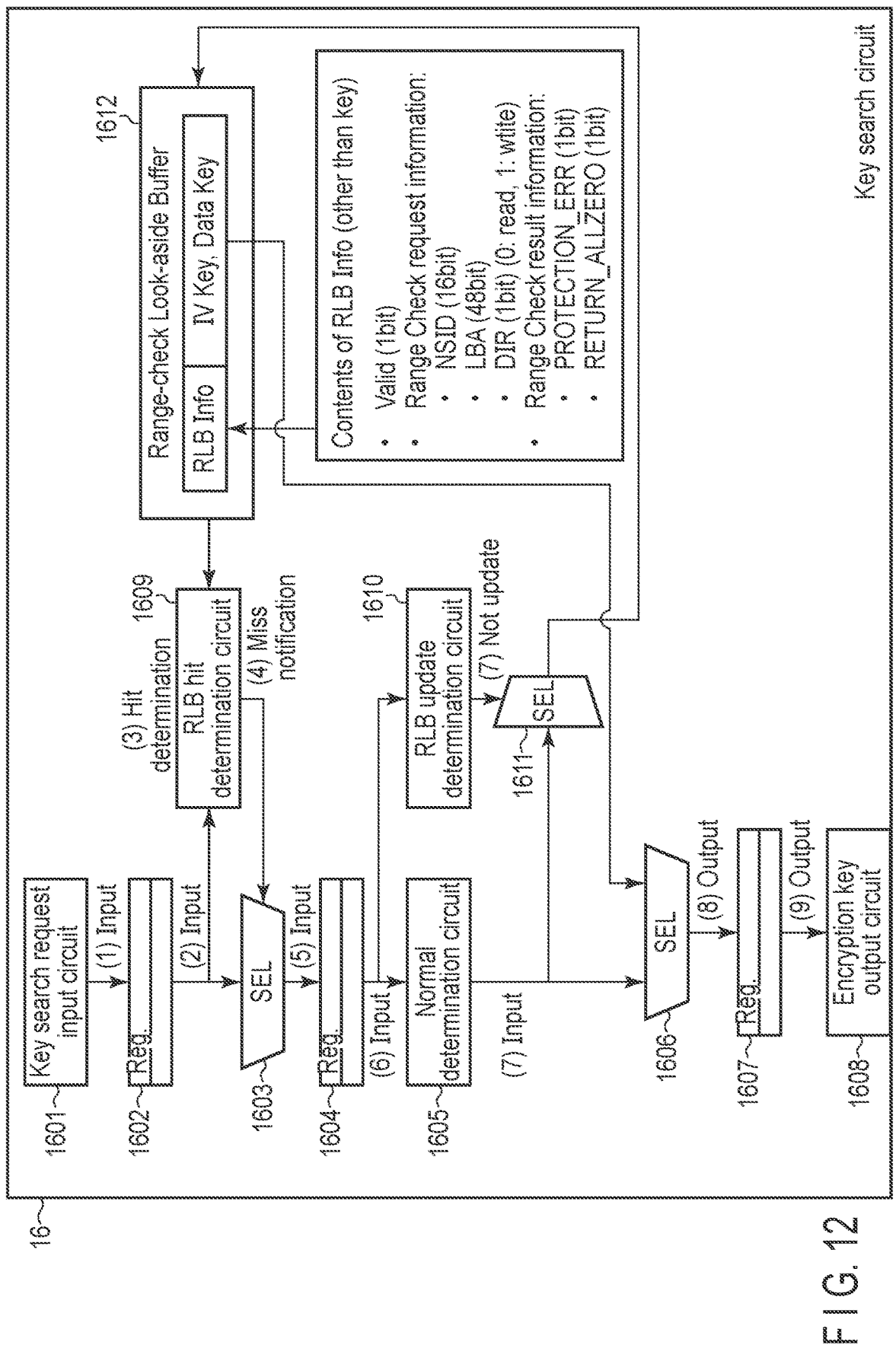
FIG. 12 is a diagram illustrating an operation of the key search circuit in a case where the search result buffer miss occurs and it is determined not to update the content stored in the search result buffer.

Next, a description will be given regarding an operation of the key search circuit 16 in a case where the RLB hit determination circuit 1609 determines that the obtained key search request does not hit (misses) the search result stored in the RLB 1612 and the RLB update determination circuit 1610 determines not to update the content stored in the RLB 1612. FIG. 12 is a diagram illustrating the operation of the key search circuit in a case where the search result buffer miss occurs and it is determined not to update the content stored in the search result buffer. First, the key search request input circuit 1601 starts to operate in response to the key search request input circuit 1601 of the key search circuit 16 receiving a key search request from the encryption/decryption circuit 18, which is similar to FIG. 10.

(1) The key search request input circuit 1601 inputs the received key search request to the register 1602.

(2) The RLB hit determination circuit 1609 obtains the key search request from the register 1602. Then, the selector 1603 also obtains the key search request from the register 1602.

(3) The RLB hit determination circuit 1609 determines whether the obtained key search request hits a search result stored in the RLB 1612. Here, a case where the obtained key search request does not hit (misses) the search result stored in the RLB 1612 will be described.

(4) The RLB hit determination circuit 1609 transmits a miss notification to the selector 1603. The selector 1603 having received the miss notification is controlled to store the input key search request to the register 1604.

(5) The selector 1603 stores the key search request obtained from the register 1602 to the register 1604 based on the miss notification transmitted from the RLB hit determination circuit 1609.

(6) The normal determination circuit 1605 and the RLB update determination circuit 1610 obtain the key search request from the register 1604.

(7) The normal determination circuit 1605 executes the normal determination process, and the RLB update determination circuit 1610 determines whether to update the content stored in the RLB 1612. The normal determination circuit 1605 inputs a search result obtained by the normal determination process to the selector 106 and the selector 1611. Then, the RLB update determination circuit 1610 transmits a notification indicating whether to update the RLB 1612 to the selector 1611. Here, a case where the RLB update determination circuit 1610 determines not to update the content stored in the RLB 1612 will be described. The selector 1611 does not store the search result input from the normal determination circuit 1605 in the RLB 1612 based on the determination that update is not to be performed, which has been transmitted from the RLB update determination circuit 1610. As a result, the content stored in the RLB 1612 is not updated.

(8) The selector 1606 to which the search result has been input from the normal determination circuit 1605 selects the search result and outputs the search result to the register 1607.

(9) The encryption key output circuit 1608 obtains the search result from the register 1607 and outputs the obtained search result to the encryption/decryption circuit 18.

As a result, the key search circuit 16 does not newly store the search result, obtained by executing the normal determination process by the normal determination circuit 1605, in the RLB 1612 when the RLB update determination circuit has determined that update is not to be performed.

Next, an RLB hit determination process executed by the RLB hit determination circuit 1609 will be described. FIG. 13 is a flowchart illustrating a procedure of a search result buffer hit determination process executed in the memory system 3 according to the embodiment. First, the RLB hit determination circuit 1609 starts the RLB hit determination process in response to obtaining a key search request.

First, the RLB hit determination circuit 1609 determines whether information stored in the RLB 1612 is valid (Step S11). The RLB hit determination circuit 1609 refers to RLB Info and determines whether the valid flag indicates "valid".

When the information stored in the RLB 1612 is not valid (No in Step S11), the RLB hit determination circuit 1609 outputs a miss as an RLB hit determination result (Step S15). As a result, the key search request is transmitted to the normal determination circuit 1605.

On the other hand, when the information stored in the RLB 1612 is valid (Yes in Step S11), the RLB hit determination circuit 1609 executes the following determinations (1), (2), and (3) (Step S12).

(1) An NSID specified by the key search request matches an NSID stored in the RLB 1612.

(2) A logical product of an LBA specified by the key search request and an LBA mask matches a logical product of an LBA stored in the RLB 1612 and the LBA mask.

(3) DIR specified by the key search request matches DIR stored in the RLB 1612.

Here, the LBA mask is a value defined such that the logical product of the LBA and the LBA mask becomes a value obtained by ignoring lower bits of this LBA. A comparison can be made while ignoring values of a predetermined number of lower bits defined by the LBA mask by comparing the logical product of the LBA specified by the key search request and the LBA mask with the logical product of the LBA stored in the RLB 1612 and the LBA mask. For example, when the LBA mask is "ffff_ffff_fff8" in hexadecimal notation, the lower 3 bits out of the 48-bit LBA can be ignored, and only the upper 45 bits out of the 48-bit LBA specified by the key search request can be compared with only the upper 45 bits of the 48-bit LBA stored in the RLB 1612. When the LBA mask is defined to a value that masks the lower 3 bits in this manner, it is possible to determine whether a cluster including the LBA specified by the key search request matches a cluster including the LBA stored in the RLB 1612.

Then, the RLB hit determination circuit 1609 determines whether the determinations (1), (2), and (3) in Step S12 are all Yes (Step S13).

When any of the determinations in Step S12 is No (No in Step S13), the RLB hit determination circuit 1609 outputs a miss as the RLB hit determination result (Step S15). As a result, the key search request is transmitted to the normal determination circuit 1605.

When all the determinations in Step S13 are Yes (Yes in Step S13), the RLB hit determination circuit 1609 outputs a hit as the RLB hit determination result (Step S14). As a result, the key search request is not transmitted to the normal determination circuit 1605, and the search result stored in the RLB 1612 is transmitted to the encryption key output circuit 1608.

Figure 14:
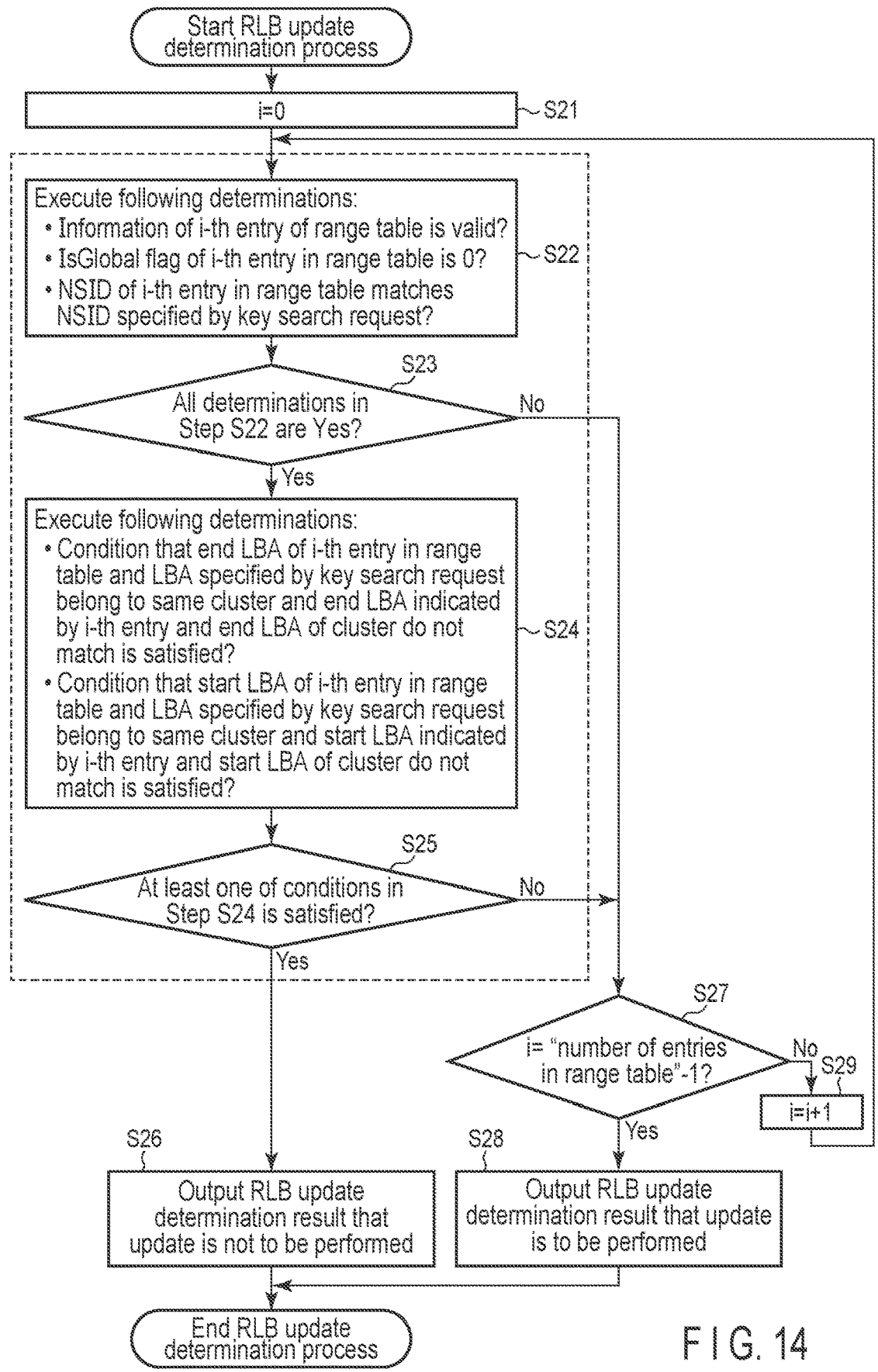
FIG. 14 is a flowchart illustrating a procedure of a search result buffer update determination process executed in the memory system according to the embodiment.

Next, an RLB update determination process executed by the RLB update determination circuit 1610 will be described. FIG. 14 is a flowchart illustrating a procedure of a search result buffer update determination process executed in the memory system 3 according to the embodiment. First, the RLB update determination circuit 1610 starts the RLB update determination process in response to obtaining a key search request.

Note that an LBA mask used in the RLB update determination process of FIG. 14 has the same mask pattern as the LBA mask used in the RLB hit determination process of FIG. 13. For example, when the LBA mask (="hffff_ffff_fff8) is used in the RLB hit determination process of FIG. 13, the LBA mask (="hffff_ffff_fff8) is also used in the RLB update determination process of FIG. 14.

In the RLB update determination process, it is determined whether range boundaries of a plurality of ranges set in the range table 31 are included in a batch search range including an LBA specified by the key search request. If it is possible to confirm the range boundaries of the plurality of ranges set in the range table 31 are not included inside the batch search range including the LBA specified by the key search request, the RLB update determination circuit 1610 outputs "update is to be performed" as an RLB update determination result. If not, the RLB update determination circuit 1610 outputs "update is not to be performed" as the RLB update determination result. The specific procedure thereof is as follows.

First, the RLB update determination circuit 1610 initializes a value of a variable (i) used as an index for referring to the range table 31 (Step S21). The RLB update determination circuit 1610 refers to an entry in the range table 31 corresponding to the value of the index.

The RLB update determination circuit 1610 executes the following determinations (1), (2), and (3) (Step S22).

(1) The RLB update determination circuit 1610 determines whether information of the i-th entry of the range table 31 is valid.

(2) The RLB update determination circuit 1610 determines whether an IsGlobal flag of the i-th entry in the range table 31 is 0 (indicates a non-global range entry).

(3) The RLB update determination circuit 1610 determines whether an NSID of the i-th entry in the range table 31 matches an NSID specified by the key search request.

The RLB update determination circuit 1610 determines whether all the determinations executed in Step S22 are Yes (Step S23).

When all the determinations in Step S22 are Yes (Yes in Step S23), the RLB update determination circuit 1610 executes the following determinations (1) and (2) (Step S24).

(1) The RLB update determination circuit 1610 determines whether a condition that an end LBA of the i-th entry in the range table 31 and the LBA specified by the key search request belong to the same cluster and the end LBA indicated by the i-th entry and an end LBA of the cluster do not match is satisfied. In this case, the RLB update determination circuit 1610 first compares a logical product of the end LBA of the i-th entry in the range table 31 and an LBA mask with a logical product of the LBA specified by the key search request and a LBA mask. As a result, it is possible to determine whether the end LBA of the i-th entry in the range table 31 and the LBA specified by the key search request belong to the same cluster. When the end LBA of the i-th entry in range table 31 and the LBA specified by the key search request belong to the same cluster, the RLB update determination circuit 1610 compares the end LBA indicated by the i-th entry with the end LBA of the cluster, and determines whether the condition that the end LBA indicated by the i-th entry and the end LBA of the cluster do not match is satisfied.

(2) The RLB update determination circuit 1610 determines whether a condition that a start LBA of the i-th entry in the range table 31 and the LBA specified by the key search request belong to the same cluster and the start LBA indicated by the i-th entry and a start LBA of the cluster do not match is satisfied. In this case, the RLB update determination circuit 1610 first compares a logical product of the start LBA of the i-th entry in the range table 31 and the LBA mask with a logical product of the LBA specified by the key search request and the LBA mask. As a result, it is possible to determine whether the start LBA of the i-th entry in the range table 31 and the LBA specified by the key search request belong to the same cluster. When the start LBA of the i-th entry in range table 31 and the LBA specified by the key search request belong to the same cluster, the RLB update determination circuit 1610 compares the start LBA indicated by the i-th entry with the start LBA of the cluster, and determines whether the condition that the start LBA indicated by the i-th entry and the start LBA of the cluster do not match is satisfied.

The RLB update determination circuit 1610 determines whether at least one of the determinations in Step S24 is satisfied (Step S25).

When at least one of the determinations in Step S24 is satisfied (Yes in Step S25), the RLB update determination circuit 1610 outputs the RLB update determination that update is not to be performed (Step S26).

Then, the RLB update determination circuit 1610 ends the RLB update determination process (end).

When any of the determinations in Step S22 is No (No in Step S23) or none of the determinations in Step S24 are satisfied (No in Step S25), the RLB update determination circuit 1610 determines whether the value of the variable (i) is equal to a number obtained by subtracting one from the number of entries in the range table 31 (Step S27). That is, it is determined whether the entry indicated by the variable (i) corresponds to the last entry in the range table 31.

If the value of the variable (i) is equal to the number obtained by subtracting one from the number of entries in the range table 31 (Yes in Step S27), the RLB update determination circuit 1610 outputs the RLB update determination that update is to be performed (Step S28).

Then, the RLB update determination circuit 1610 ends the RLB update determination process (end).

When the value of the variable (i) is different from the number obtained by subtracting one from the number of entries in the range table 31 (No in Step S27), the RLB update determination circuit 1610 increments the value of the index (i) by one (Step S29).

Thereafter, the RLB update determination circuit 1610 executes the processes in Step S22 and the subsequent steps again. As a result, it is possible to determine whether the range boundaries of the plurality of ranges set in the range table 31 are included in the batch search range including the LBA specified by the key search request.

Through such an operation of the RLB update determination circuit 1610, it is detected whether key search results are the same across the batch search unit (for example, a cluster including 8 LBAs), and control is performed to update the RLB 1612 only when the results are the same. The RLB update determination circuit 1610 also determines whether received key search request hits the content stored in the RLB 1612 based on whether the LBA specified by the key search request and the LBA stored in the RLB 1612 are included in the same batch search unit.

When whether the key search results are the same across the batch search unit has not been detected, only a case where the LBA specified by the received key search request and the LBA stored in the RLB 1612 exactly match can be handled as a hit of the RLB 1612, but a hit rate of the RLB 1612 can be increased by detecting whether the key search results are the same across the batch search unit.

Next, the key search process when the memory system 3 receives a write command will be described. FIG. 15 is a diagram illustrating a specific example of a key search operation executed for each LBA included in an access range specified by an access request from the host.

In FIG. 15, Range 1 and Range 2 are set in the namespace NS3. A start LBA of Range 1 is LBA 0 and an end LBA of Range 1 is LBA 99. Further, a start LBA of Range 2 is LBA 100, and an end LBA of Range 2 is LBA 199.

An LBA space of the namespace NS3 includes a plurality of clusters each including eight consecutive LBAs. Here, Cluster 11 includes LBA 88, LBA 89, . . . , and LBA 95, Cluster 12 includes LBA 96, LBA 97, . . . , and LBA 103, and Cluster 13 includes LBA 104, LBA 105, . . . , and LBA 111.

Here, the case where the memory system 3 receives the write command is assumed. This write command specifies NS3 as the NSID, LBA 90 as the start LBA, and 20 as the number of LBAs (NLBA).

At this time, the key search circuit 16 executes the key search process for each LBA specified by the write command. Here, a case where the key search circuit 16 executes the key search process in order from the start LBA 90 will be described. At this time, a case where the RLB 1612 of the key search circuit 16 does not store any search result is assumed.

First, the key search circuit 16 executes the key search process for a key search request that specifies LBA 90. Here, the RLB hit determination circuit 1609 determines a miss since the RLB 1612 does not store any search result. Then, the RLB update determination circuit 1610 executes the update determination process. Cluster 11 including LBA 90 belongs only to Range 1, and Cluster 11 does not include the start LBA and the end LBA of Range 1, and the start LBA and the end LBA of Range 2. The RLB update determination circuit 1610 determines to update the RLB 1612. As a result, the RLB 1612 stores the key search request specifying LBA 90 and a search result corresponding to LBA 90. Since Cluster 11 does not include any range boundary, the search result corresponding to LBA 90 is the search result common to all the eight LBAs included in Cluster 11.

Next, the key search circuit 16 executes the key search process for a key search request that specifies LBA 91. The RLB hit determination circuit 1609 determines a hit for the key search request specifying LBA 91 included in the same cluster as LBA 90 since the search result corresponding to LBA 90 is stored. Therefore, the key search circuit 16 responds to the key search request specifying LBA 91 using the search result stored in the RLB 1612.

The key search circuit 16 executes the same processing as that for the key search request specifying LBA 91 with respect to key search requests specifying LBAs 92, 93, 94, and 95, respectively.

Next, the key search circuit 16 executes the key search process for a key search request specifying LBA 96. Since the RLB 1612 stores the search result corresponding to LBA 90, the RLB hit determination circuit 1609 determines a miss for the key search request specifying LBA 96 included in a different cluster. Then, the RLB update determination circuit 1610 executes the update determination process. Since Cluster 12 including LBA 96 includes the start LBAs and the end LBAs of Range 1 and Range 2, the RLB update determination circuit 1610 outputs the determination that update is not to be performed. Therefore, the key search circuit 16 does not update the search result stored in the RLB 1612, but responds to the key search request specifying LBA 96 using the search result obtained by the normal determination circuit 1605.

The key search circuit 16 executes the same processing as that for the key search request specifying LBA 96 with respect to key search requests specifying LBAs 97, 98, . . . , and 103, respectively.

Next, the key search circuit 16 executes the key search process for a key search request specifying LBA 104. Here, the RLB hit determination circuit 1609 determines a miss since the RLB 1612 stores the search result corresponding to LBA 90. Then, the RLB update determination circuit 1610 executes the update determination process. Since Cluster 13 including LBA 104 does not include the start LBAs and the end LBAs of Range 1 and Range 2, the RLB update determination circuit 1610 outputs the determination that update is to be performed. As a result, the RLB 1612 stores the search result corresponding to LBA 104.

Next, the key search circuit 16 executes the key search process for a key search request specifying LBA 105. Since the RLB hit determination circuit 1609 stores the search result corresponding to LBA 104, the RLB hit determination circuit 1609 determines a hit for the key search request specifying LBA 105 included in the same cluster. Therefore, the key search circuit 16 responds to the key search request specifying LBA 105 using the search result stored in the RLB 1612.

The key search circuit 16 executes the same processing as that for the key search request specifying LBA 105 with respect to key search requests specifying LBAs 106, 107, 108, and 109, respectively.

As described above, the key search circuit 16 can refer to the range table 31 based on the LBA specified by the received key search request and store the obtained access control information and encryption key in the RLB 1612 according to the embodiment. When the received key search request hits the content stored in the RLB 1612, the key search circuit 16 can output the search result including the access control information and the encryption key stored in the RLB 1612.

As a result, the key search circuit 16 can skip the normal determination process by the normal determination circuit 1605 and output the search result including the access control information and the encryption key. Therefore, it is possible to shorten the time required to search for the access control information and the encryption key.

Further, the RLB update determination circuit 1610 determines whether to update the content stored in the RLB 1612 based on whether range boundaries of the plurality of ranges are included inside the batch search unit that includes the LBA specified by the received key search request according to the embodiment. Further, the RLB hit determination circuit 1609 determines whether received key search request hits the content stored in the RLB 1612 based on whether the LBA specified by the received key search request and the LBA stored in the RLB 1612 are included in the same batch search unit. As a result, the content stored in the RLB 1612 can be used as the search result not only in the case where the LBA specified by the received key search request matches the LBA stored in the RLB 1612 but also in a case where the cluster including the LBA specified by the received key search request matches the cluster including the LBA stored in the RLB 1612, for example. Thus, it is possible to increase the hit rate of the RLB 1612.

Although the RLB update determination circuit 1610 sequentially searches for all the entries in the range table 31 independently of the normal determination process by the normal determination circuit 1605 in the present embodiment, a condition under which the RLB update determination circuit 1610 operates is the same as the condition under which the normal determination circuit 1605 operates, and the normal determination circuit 1605 also needs to search for all the entries in the range table 31. Thus, the normal determination process and the RLB update determination process may be performed at the same time by adopting a configuration in which both the RLB update determination circuit 1610 and the normal determination circuit 1605 are arranged on in the same design module. Further, control may be performed not to update the RLB 1612 when range information corresponding to a key search request has not been found and an error such as absence of a corresponding encryption key has been detected in the normal determination process by the normal determination circuit 1605. Although the case where the number of entries included in the RLB 1612 is one has been exemplified in the present embodiment, the RLB 1612 may be configured to include a plurality of entries and the RLB 1612 may be configured to be fully-associative or set-associative.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a storage; an encryption/decryption circuit; and a key search circuit, wherein
the encryption/decryption circuit is configured to encrypt plain-text data received from the host using an encryption key obtained by the key search circuit to generate cipher-text data that is to be written to the storage, and decrypt the cipher-text data read from the storage using the encryption key to generate the plain-text data,
the key search circuit is configured to output, in response to reception of a key search request from the encryption/decryption circuit, access control information and an encryption key which is to be used by the encryption/decryption circuit to the encryption/decryption circuit, the key search request specifying a logical block address specified by an access request received from the host and an access type indicating whether the access request is read or write, the access control information indicating permission or prohibition of access to the logical block address specified by the received key search request,
the key search circuit is configured to:
manage a range table that stores, for each of a plurality of ranges which are set in a logical block address space of the memory system, information indicating an address range of consecutive logical block addresses included in a corresponding range of the plurality of ranges, access control information indicating permission or prohibition of access to the corresponding range, and an encryption key which is to be applied to data corresponding to the corresponding range; and
manage a search result buffer that stores a search result including access control information and an encryption key, which are obtained by referring to the range table based on a key search request, together with a key search request,
the key search circuit includes:
a hit determination circuit that determines whether the received key search request hits a content stored in the search result buffer; and
an update determination circuit that determines whether to update the content stored in the search result buffer, and
the key search circuit is further configured to:
when the hit determination circuit determines that the received key search request hits the content stored in the search result buffer, output the search result stored in the search result buffer to the encryption/decryption circuit;
when the hit determination circuit determines that the received key search request does not hit the content stored in the search result buffer, obtain a search result from the range table by referring to the range table based on the received key search request, and output the search result obtained from the range table to the encryption/decryption circuit, the search result including access control information indicating permission or prohibition of access to the logical block address specified by the received key search request and an encryption key that is to be applied to data corresponding to the logical block address; and
when the update determination circuit determines to update the content stored in the search result buffer, update the content stored in the search result buffer with the received key search request and the search result obtained from the range table.

2. The memory system according to claim 1, wherein the update determination circuit is configured to determine whether to update the content stored in the search result buffer based on whether range boundaries of the plurality of ranges are included inside a batch search unit including the logical block address specified by the received key search request, the batch search unit being one of a plurality of batch search units obtained by dividing the logical block address space of the memory system into units each of which includes a certain number of consecutive logical block addresses, and
the hit determination circuit is configured to determine whether the received key search request hits the content stored in the search result buffer based on whether the logical block address specified by the received key search request and a logical block address specified by the key search request stored in the search result buffer are included in a same batch search unit.

3. The memory system according to claim 2, wherein the hit determination circuit is configured to:
when the logical block address specified by the received key search request and the logical block address specified by the key search request stored in the search result buffer are included in the same batch search unit, determine that the received key search request hits the content stored in the search result buffer, and
when the logical block address specified by the received key search request and the logical block address specified by the key search request stored in the search result buffer are not included in the same batch search unit, determine that the received key search request does not hit the content stored in the search result buffer.

4. The memory system according to claim 2, wherein each of the batch search units is a cluster including eight consecutive logical block addresses.

5. The memory system according to claim 1, wherein the key search circuit is configured to:
receive a plurality of key search requests from the encryption/decryption circuit, the number of plurality of key search requests being equal to the number of logical block addresses included in an access range specified by the access request received from the host, each of the plurality of key search requests specifying one logical block address of logical block addresses included in the access range and an access type indicating whether the access request is read or write, and
each time one key search request is received from the encryption/decryption circuit, output access control information and an encryption key, which is to be used by the encryption/decryption circuit, to the encryption/decryption circuit, the access control information indicating permission or prohibition of access to the logical block address specified by the received key search request.

6. The memory system according to claim 5, wherein the access request from the host specifies an identifier of a namespace that is to be accessed, a start logical block address indicating a first sector included in the access range, and the number of logical block addresses included in the access range, and
each of the plurality of key search requests includes the identifier of the namespace, one logical block address of the logical block addresses included in the access range, and the access type indicating whether the access request is read or write.

7. The memory system according to claim 1, wherein the storage is a nonvolatile semiconductor memory.

8. The memory system according to claim 1, wherein the storage is a magnetic disk medium.

9. A memory system connectable to a host, comprising:
a storage; an encryption/decryption circuit; and a key search circuit, wherein
the encryption/decryption circuit is configured to encrypt plain-text data received from the host using an encryption key obtained by the key search circuit to generate cipher-text data that is to be written to the storage, and decrypt the cipher-text data read from the storage using the encryption key to generate the plain-text data,
the key search circuit is configured to:
receive a plurality of key search requests from the encryption/decryption circuit, the number of plurality of key search requests being equal to the number of logical block addresses included in an access range specified by an access request received from the host, each of the plurality of key search requests specifying one logical block address of the logical block addresses included in the access range and an access type indicating whether the access request is read or write;
each time receiving one key search request among the plurality of key search requests, output access control information and an encryption key to the encryption/decryption circuit, the access control information indicating permission or prohibition of access to a logical block address specified by the received one key search request, the encryption key being to be applied to data corresponding to the logical block address specified by the received one key search request;
manage a range table that stores, for each of a plurality of ranges which are set in a logical block address space of the memory system, information indicating an address range of consecutive logical block addresses included in a corresponding range of the plurality of ranges, access control information indicating permission or prohibition of access to the corresponding range, and an encryption key which is to be applied to data corresponding to the corresponding range; and
manage a search result buffer that stores a search result including access control information and an encryption key, which are obtained by referring to the range table based on a key search request, together with a key search request,
the key search circuit includes:
a hit determination circuit that determines whether the received one key search request hits a content stored in the search result buffer based on whether the logical block address specified by the received one key search request and a logical block address specified by the key search request stored in the search result buffer are included in a same batch search unit; and
an update determination circuit that determines whether to update the content stored in the search result buffer based on whether range boundaries of the plurality of ranges are included inside a batch search unit including the logical block address specified by the received one key search request, the batch search unit being one of a plurality of batch search units obtained by dividing the logical block address space of the memory system into units each including a certain number of consecutive logical block addresses,
the key search circuit is further configured to:
when the hit determination circuit determines that the received one key search request hits the content stored in the search result buffer, output the search result stored in the search result buffer to the encryption/decryption circuit;
when the hit determination circuit determines that the received one key search request does not hit the content stored in the search result buffer, obtain a search result from the range table by referring to the range table based on the received key search request, and output the search result obtained from the range table to the encryption/decryption circuit, the search result including access control information indicating permission or prohibition of access to the logical block address specified by the received one key search request and an encryption key that is to be applied to data corresponding to the logical block address; and
when the update determination circuit determines to update the content held in the search result buffer, update the content stored in the search result buffer with the received one key search request and the search result obtained from the range table.

10. The memory system according to claim 9, wherein each of the batch search units is a cluster including eight consecutive logical block addresses.

11. The memory system according to claim 9, wherein
the access request from the host specifies an identifier of a namespace that is to be accessed, a start logical block address indicating a first sector included in the access range, and the number of logical block addresses included in the access range, and each of the plurality of key search requests includes the identifier of the namespace, one logical block address of the logical block addresses included in the access range, and the access type indicating whether the access request is read or write.

12. The memory system according to claim 9, wherein the storage is a nonvolatile semiconductor memory.

13. The memory system according to claim 9, wherein the storage is a magnetic disk medium.

* * * * *